(12) United States Patent
Kubo et al.

(10) Patent No.: US 7,505,102 B2
(45) Date of Patent: Mar. 17, 2009

(54) LIQUID CRYSTAL DISPLAY

(75) Inventors: Masumi Kubo, Ikoma (JP); Akihiro Yamamoto, Yamatokoriyama (JP); Takashi Ochi, Tenri (JP)

(73) Assignee: Sharp kabushiki Kaisha, Osaka (JP)

( * ) Notice: Subject to any disclaimer, the term of this patent is extended or adjusted under 35 U.S.C. 154(b) by 374 days.

(21) Appl. No.: 10/560,338

(22) PCT Filed: Jun. 9, 2004

(86) PCT No.: PCT/JP2004/008419

§ 371 (c)(1),
(2), (4) Date: Dec. 12, 2005

(87) PCT Pub. No.: WO2004/111714

PCT Pub. Date: Dec. 23, 2004

(65) Prior Publication Data

US 2006/0119776 A1 Jun. 8, 2006

(30) Foreign Application Priority Data

Jun. 11, 2003 (JP) .............................. 2003-166929

(51) Int. Cl.
*G02F 1/1337* (2006.01)
(52) U.S. Cl. ...................................... 349/129
(58) Field of Classification Search ................. 349/129
See application file for complete search history.

(56) References Cited

U.S. PATENT DOCUMENTS 6,195,140 B1  2/2001  Kubo et al.
6,710,825 B2  3/2004  Kubo et al.

(Continued)

FOREIGN PATENT DOCUMENTS

JP  8-136941  5/1996

(Continued)

OTHER PUBLICATIONS

International Search Report for PCT/JP2004/008419 dated Aug. 31, 2004 (English and Japanese).

(Continued)

*Primary Examiner*—David Nelms
*Assistant Examiner*—Thanh-Nhan P Nguyen
(74) *Attorney, Agent, or Firm*—Nixon & Vanderhye P.C.

(57) ABSTRACT

A liquid crystal display device of the present invention comprises picture element regions each defined by a first electrode on a first substrate on the liquid crystal layer side and a second electrode provided on a second substrate and opposing the first electrode via the liquid crystal layer. In each picture element region, the first electrode includes openings and a solid portion; and the liquid crystal layer is in a vertical alignment with no voltage, and upon voltage application, forms liquid crystal domains each taking a radially-inclined orientation above the openings and the solid portion by an oblique electric field produced in edge portions of the openings. The solid portion of the first electrode includes unit solid portions and connecting portions each for connecting at least three unit solid portions to one another. The second substrate has a first orientation-regulating structure above each connecting portion for exerting an orientation-regulating force for placing liquid crystal molecules in the liquid crystal layer above the connecting portion into the radially-inclined orientation at least with voltage application.

31 Claims, 24 Drawing Sheets

U.S. PATENT DOCUMENTS

| | | |
|---|---|---|
| 6,788,375 B2 | 9/2004 | Ogishima et al. |
| 6,862,062 B2 | 3/2005 | Kubo et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 2002/0036740 A1 | 3/2002 | Kubo et al. |
| 2002/0075436 A1 | 6/2002 | Kubo et al. |
| 2004/0041770 A1 | 3/2004 | Kubo et al. |
| 2004/0201810 A1 | 10/2004 | Kubo et al. |
| 2005/0001947 A1 | 1/2005 | Ogishima et al. |
| 2005/0001964 A1 | 1/2005 | Kubo et al. |
| 2005/0168674 A1 | 8/2005 | Kubo |
| 2005/0174528 A1 | 8/2005 | Kubo et al. |
| 2005/0237463 A1 | 10/2005 | Kubo |

FOREIGN PATENT DOCUMENTS

| | | |
|---|---|---|
| JP | 2002-107748 | 4/2002 |

OTHER PUBLICATIONS

U.S. Appl. No. 11/018,767, filed Dec. 22, 2004.
U.S. Appl. No. 10/560,340, filed Dec. 12, 2005 entitled "Liquid Crystal Display Device".
English translation of the International Preliminary Report on Patentability mailed May 11, 2006 in corresponding PCT Application No. PCT/JP2004/008419.

FIG.1
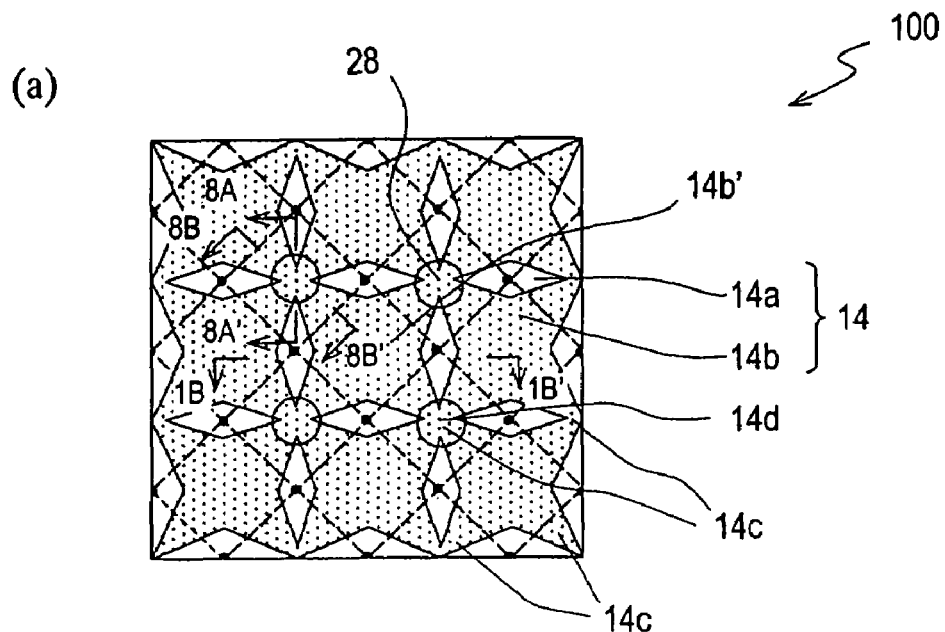
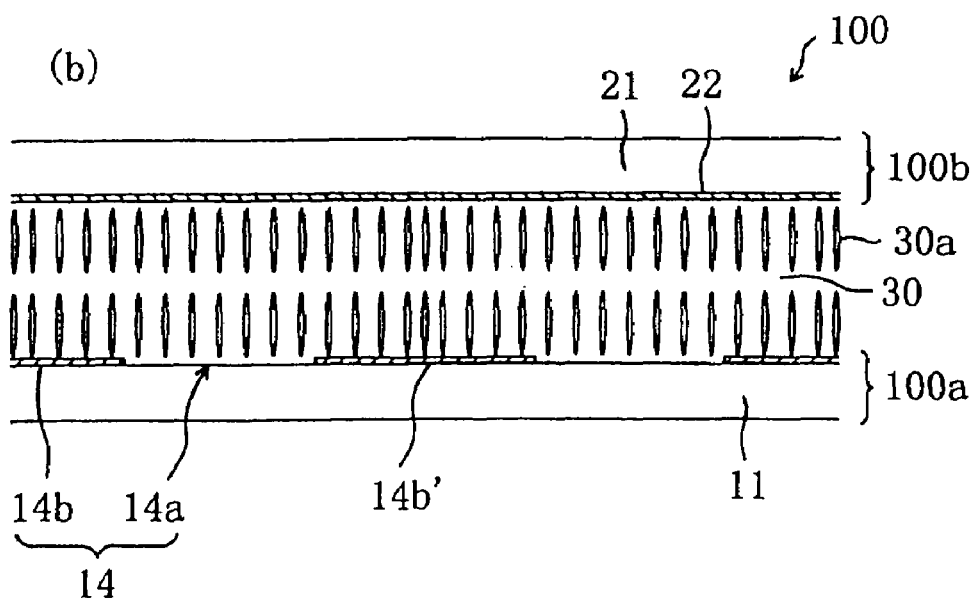

FIG.3
(a) 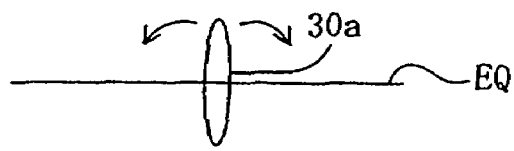
(b) 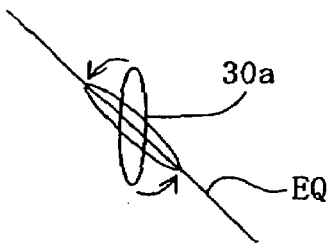
(c) 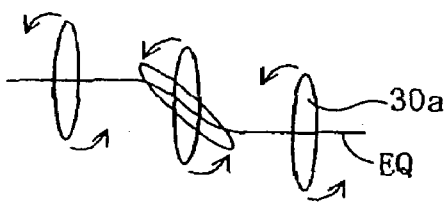
(d) 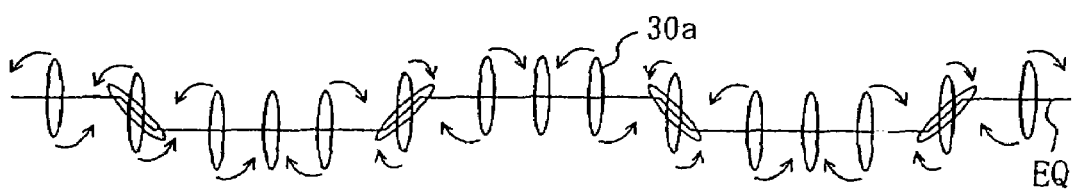

FIG.4
(a)
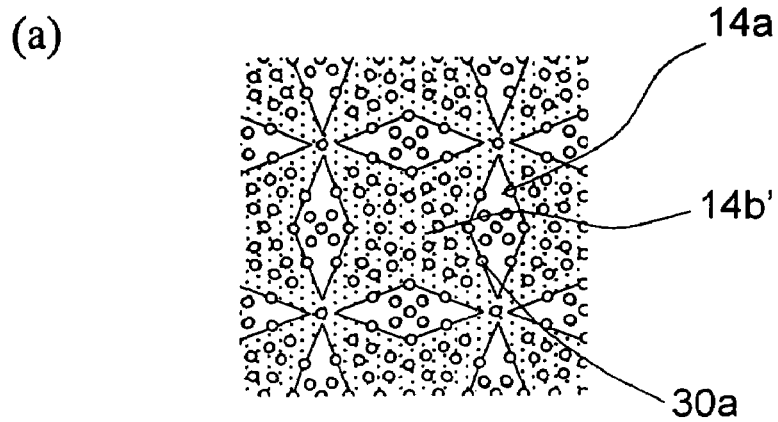
(b)
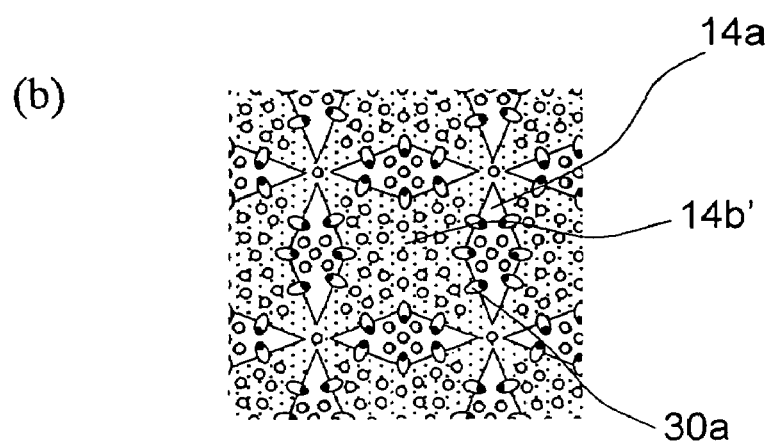
(c)
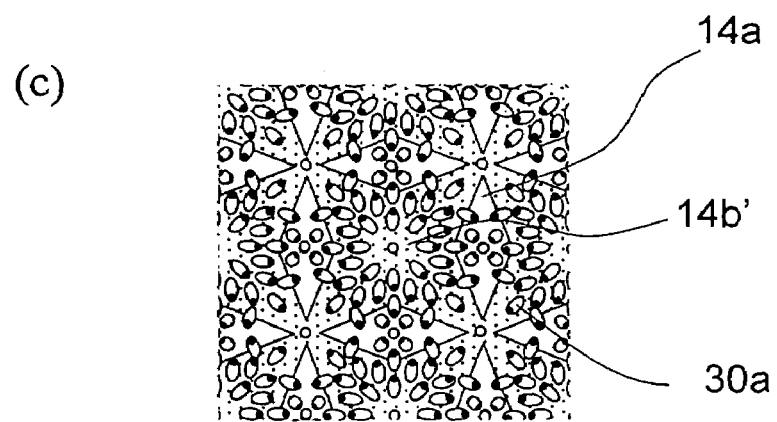

FIG.5
(a)
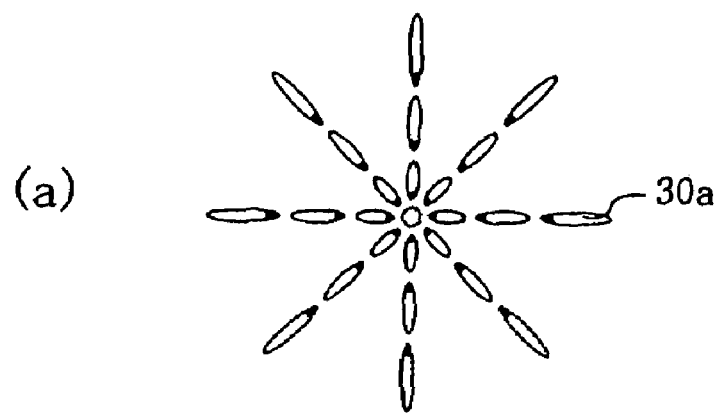
(b)
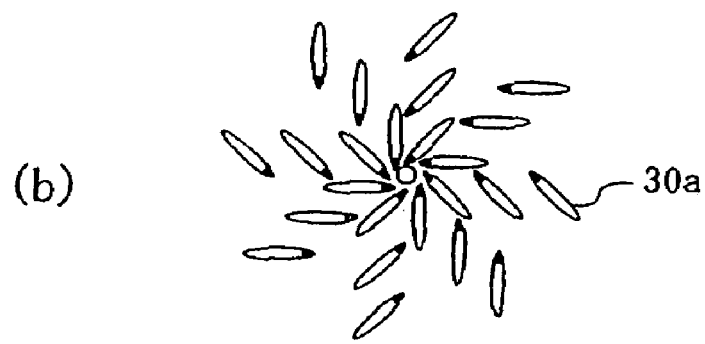
(c)
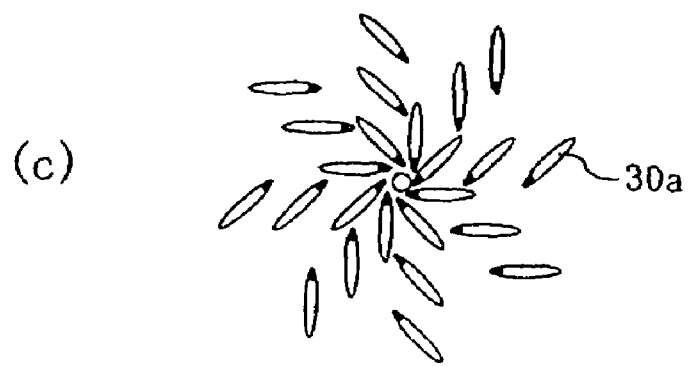

FIG.13
(a)
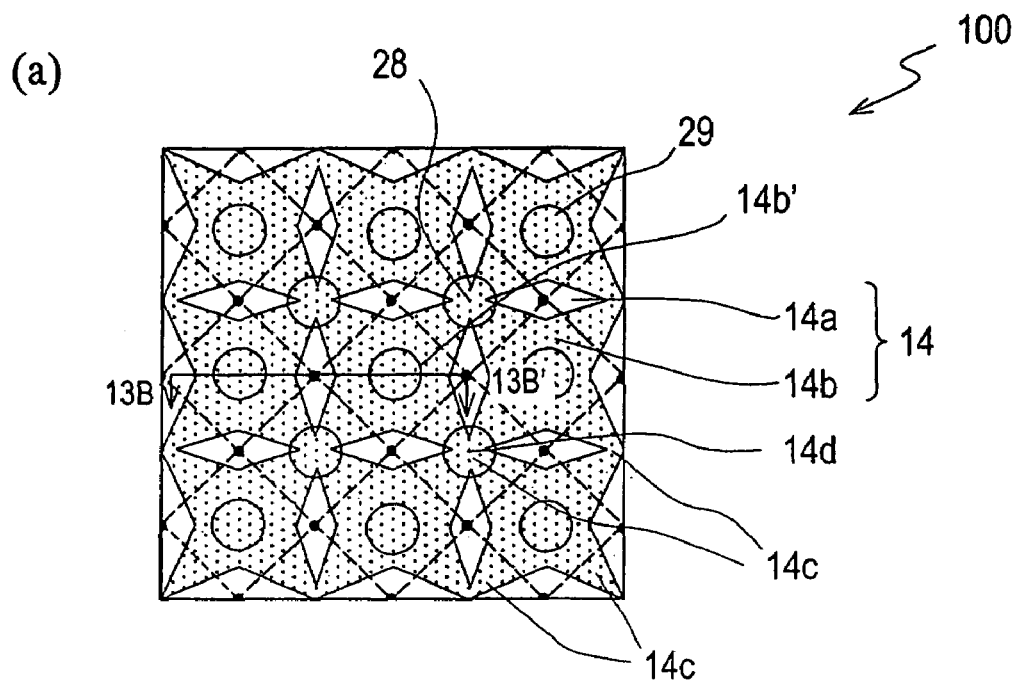
(b)
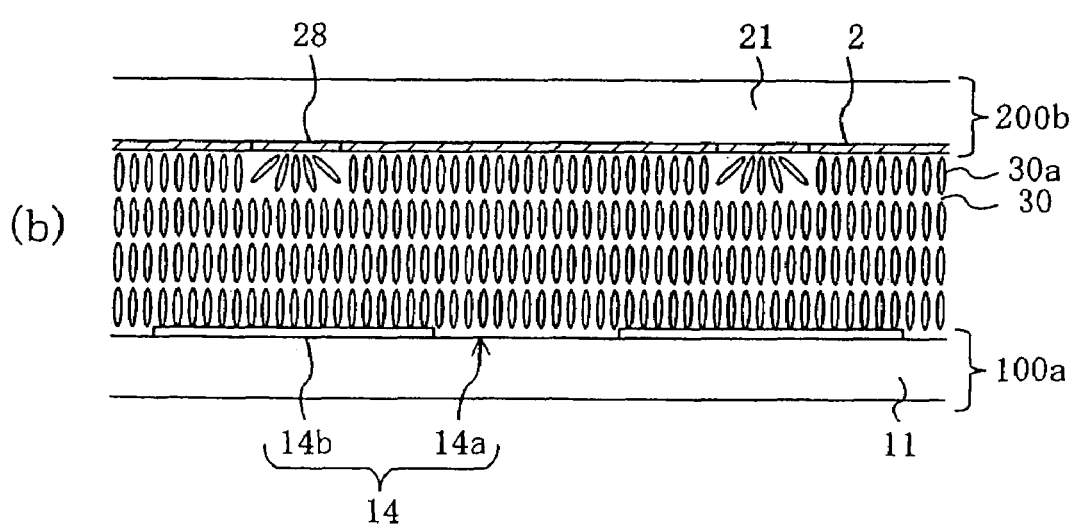

FIG.14
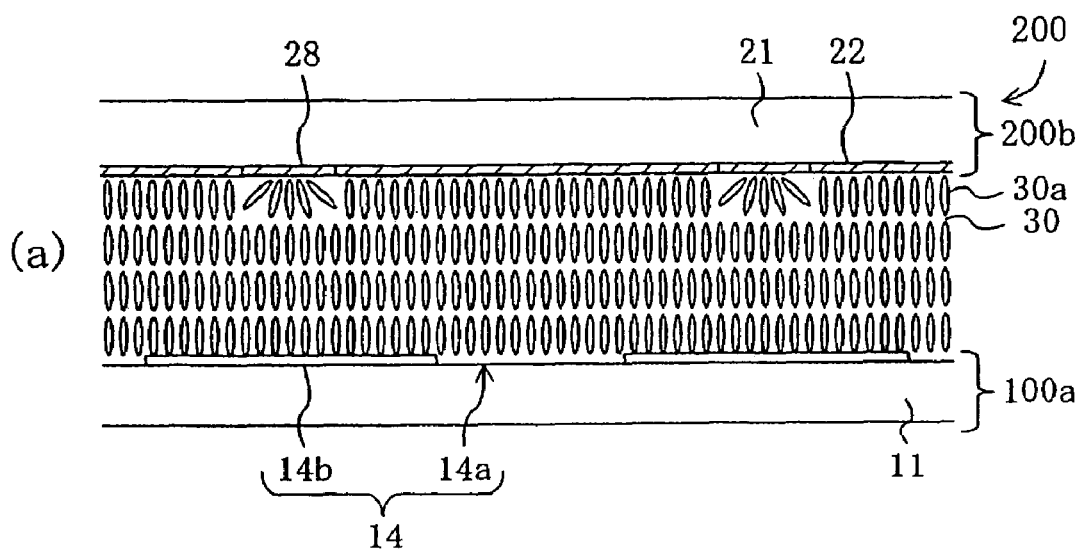
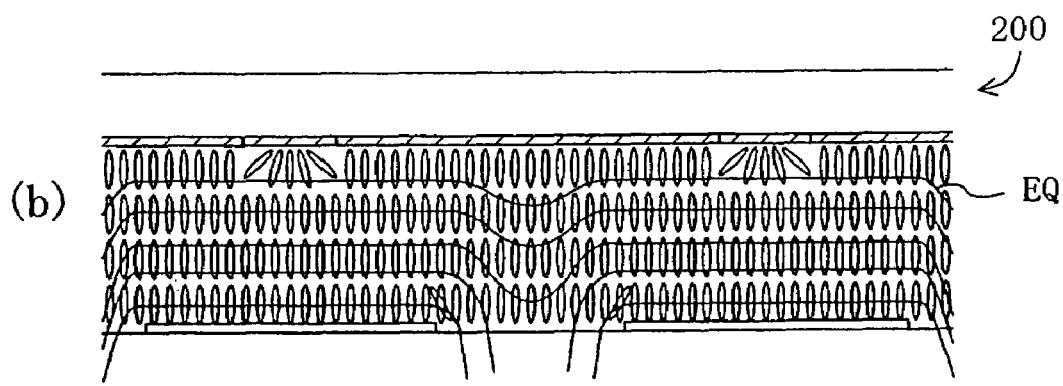
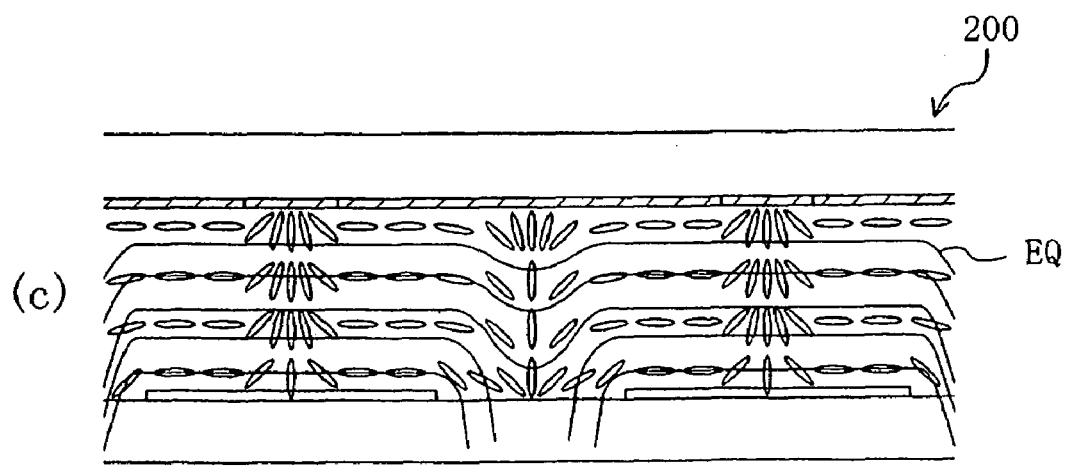

FIG.15
(a)
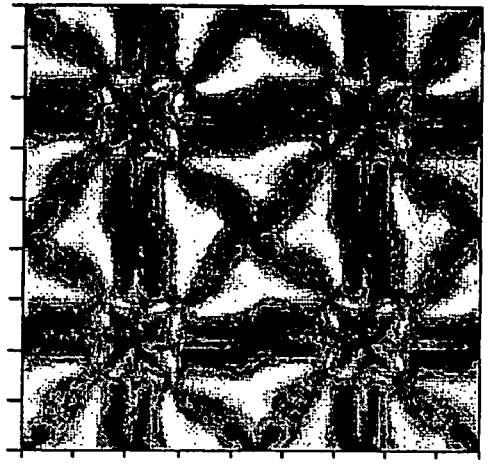
(b)
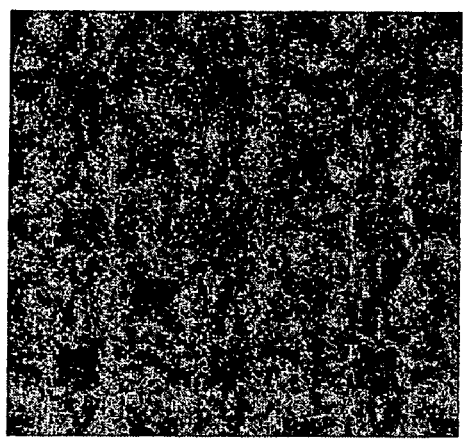
(c)
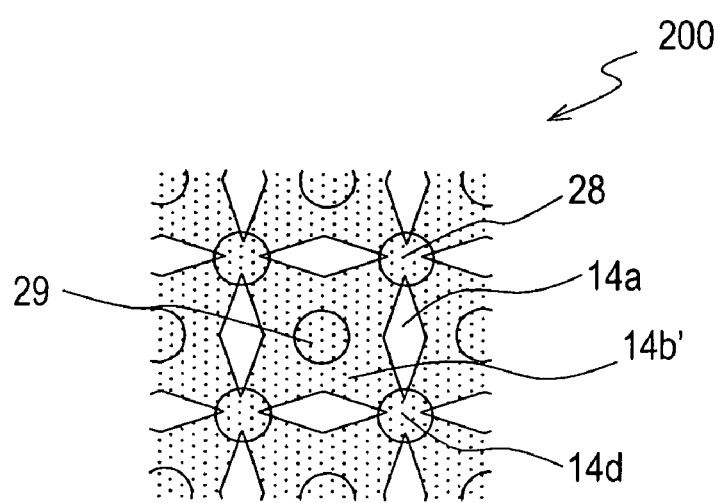

FIG. 16
(a)
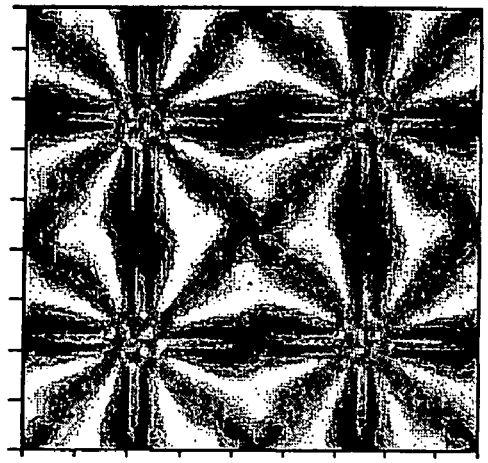
(b)
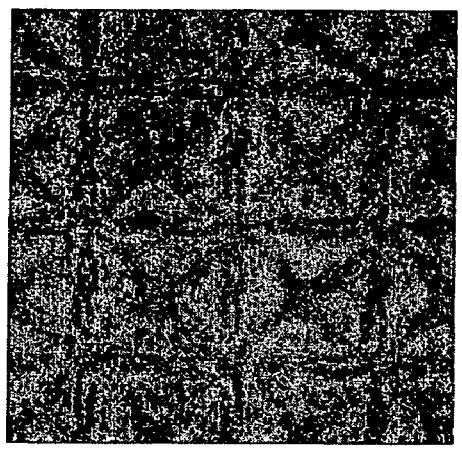
(c)
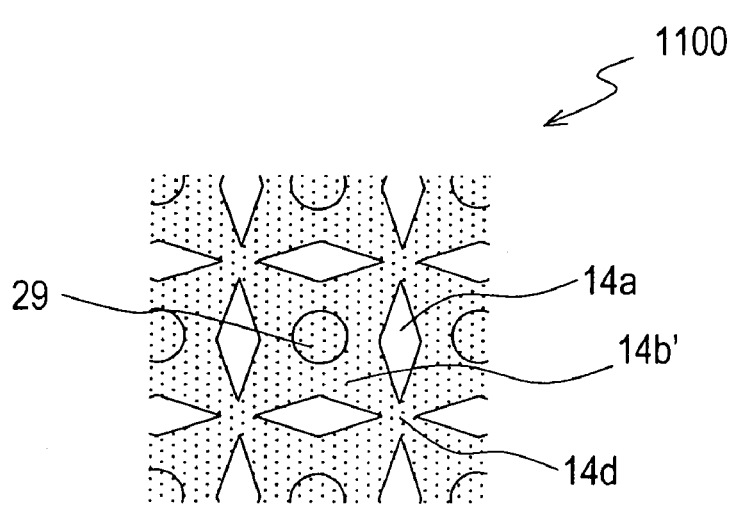

FIG.19
(a)
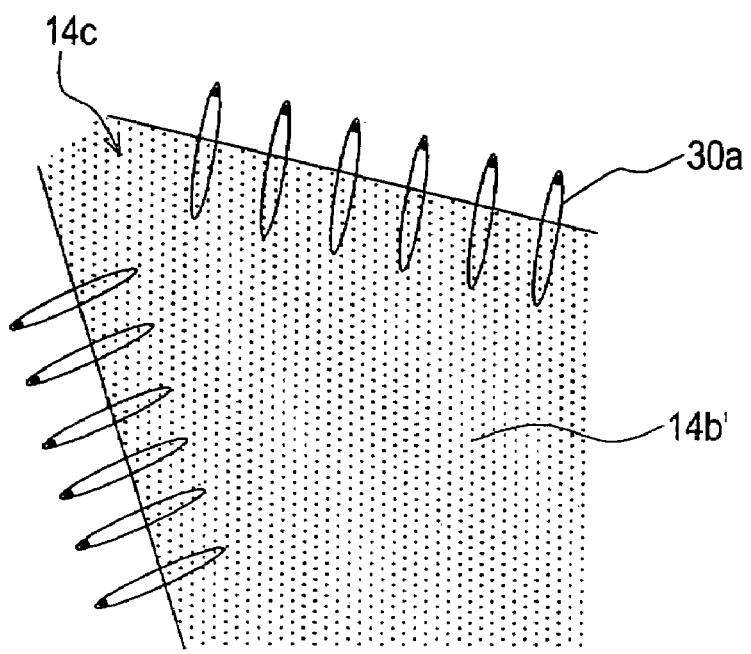
(b)
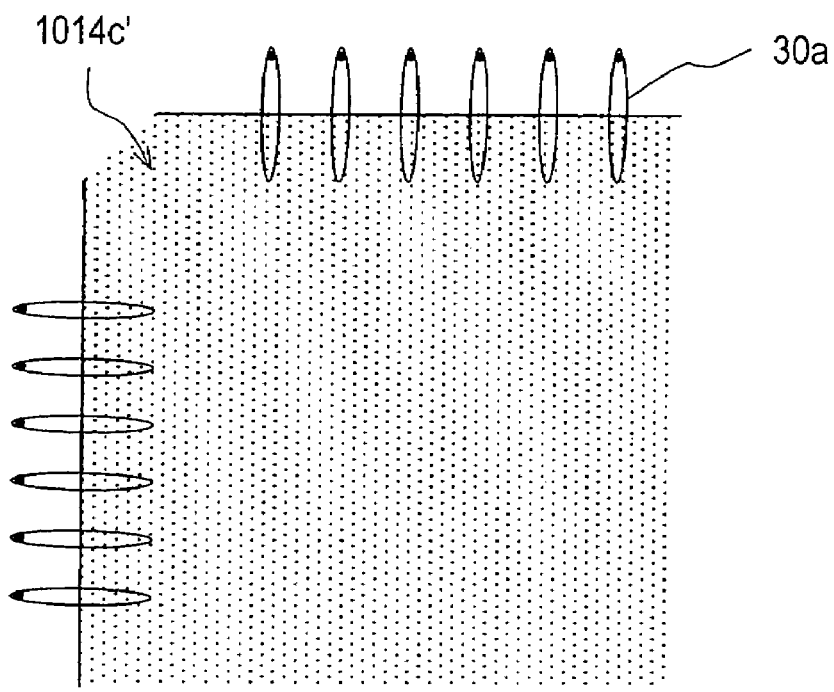

FIG.20
(a)
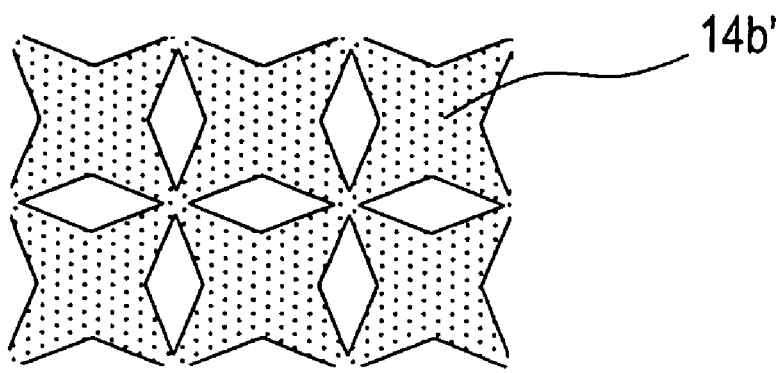
(b) IMMEDIATELY AFTER VOLTAGE APPLICATION
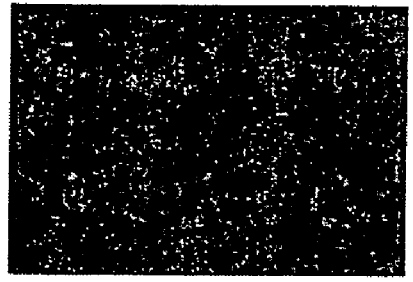
(c) STABLE STATE

FIG.21
(a)
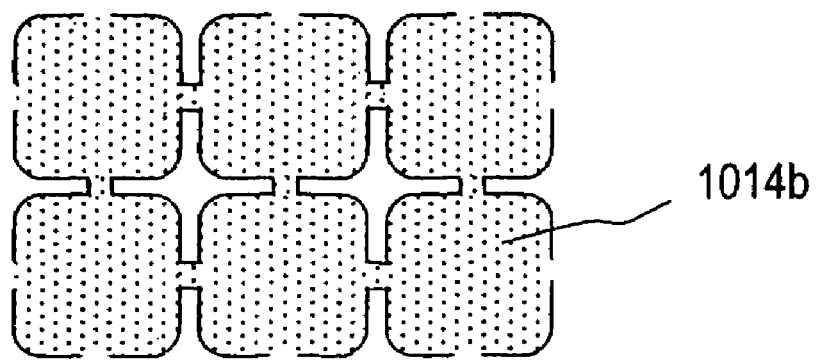
(b) IMMEDIATELY AFTER VOLTAGE APPLICATION
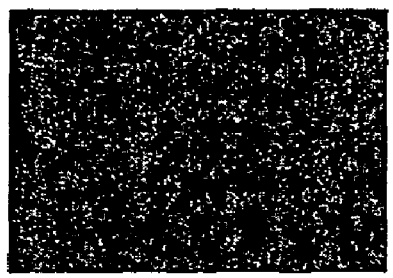
(c) STABLE STATE
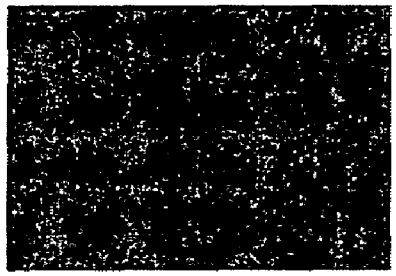

LIQUID CRYSTAL DISPLAY

This application is the U.S. national phase of international application PCT/JP2004/008419 filed 9 Jun. 2004 which designated the U.S. and claims priority to JP 2003-166929 filed 11 Jun. 2003, the entire contents of each of which are hereby incorporated by reference.

TECHNICAL FIELD

The present invention relates to a liquid crystal display device, and more particularly to a liquid crystal display device having a wide viewing angle characteristic and providing a high quality display.

BACKGROUND ART

In recent years, thin and lightweight liquid crystal display devices have been used as personal computer displays and display sections of mobile information terminal devices. However, conventional twisted nematic (TN) type and super twisted nematic (STN) type liquid crystal display devices have a problem of narrow viewing angle. Various technical developments have been undertaken to solve the problem.

A typical technique for improving the viewing angle characteristic of a TN or STN type liquid crystal display device is to add an optical compensation plate. Another approach is to employ a transverse electric field mode, in which an electric field horizontal with respect to the substrate surface is applied across the liquid crystal layer. Transverse electric field mode liquid crystal display devices have been mass-produced and attracting public attention in recent years. Still another technique is to employ a DAP (deformation of vertical aligned phase) mode, in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly narrower production margin than that of a normal TN type device. This arises a problem that it is difficult to realize stable production of the device. Such a narrow production margin is imposed because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to precisely control these factors and thus to realize stable production of the device.

In order to realize a uniform display without roughness with a DAP mode liquid crystal display device, alignment control is necessary. Alignment control can be provided by, for example, subjecting the surface of an alignment film to rubbing. However, rubbing is not suitable for mass-production because when a vertical alignment film is subjected to rubbing, rubbing streaks are likely to appear in the displayed image.

In view of this, the present inventors, along with others, has proposed the following technique (Japanese Laid-Open Patent Publication No. 2003-043525): A predetermined electrode structure including an opening and a solid portion is formed in one of a pair of electrodes opposing each other with a liquid crystal layer interposed therebetween, and a plurality of liquid crystal domains each taking a radially-inclined orientation are formed in the opening and the solid portion by an oblique electric field produced in an edge portion of the opening. Using this technique, the liquid crystal domains taking a radially-inclined orientation are formed stably and highly continuously, which can improve the viewing angle characteristic and the display quality.

However, as liquid crystal display devices become increasingly common, higher display characteristics are demanded therefor. A still higher display characteristics are desired.

DISCLOSURE OF INVENTION

In order to overcome the problems described above, the present invention provide a liquid crystal display device having a wide viewing angle characteristic and superb display characteristics.

A liquid crystal display device according to the present invention comprises a first substrate, a second substrate, and a liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer interposed therebetween. In each of the plurality of picture element regions, the first electrode includes a plurality of openings and a solid portion; and the liquid crystal layer is in a vertical orientation state when no voltage is applied between the first electrode and the second electrode, and when a voltage is applied between the first electrode and the second electrode, forms a plurality of liquid crystal domains each taking a radially-inclined orientation in correspondence with the plurality of openings and the solid portion by an oblique electric field produced in edge portions of the plurality of openings of the first electrode. The solid portion of the first electrode includes a plurality of unit solid portions and a plurality of connecting portions each for connecting at least three unit solid portions of the plurality of unit solid portions to one another. The second substrate has a first orientation-regulating structure in an area corresponding to each of the plurality of connecting portions, the first orientation-regulating structure exerting an orientation-regulating force for placing liquid crystal molecules in the liquid crystal layer above each of the plurality of connecting portions into a radially-inclined orientation at least in a state where a voltage is applied between the first electrode and the second electrode. Owing to this, the above-described objective is achieved.

In one preferred embodiment, the liquid crystal layer forms a liquid crystal domain taking a radially-inclined orientation in correspondence with each of the plurality of connecting portions by the orientation-regulating force exerted by the first orientation-regulating structure.

In one preferred embodiment, each of the plurality of connecting portions connects four unit solid portions of the plurality of unit solid portions to one another.

In one preferred embodiment, each of the unit solid portions has a plurality of corners; and each of the plurality of connecting portions connects adjacent unit solid portions of the plurality of unit solid portions to one another via the plurality of corners.

Preferably, the plurality of corners are each acute.

In one preferred embodiment, the plurality of corners are four corners.

In one preferred embodiment, the first orientation-regulating structure exerts the orientation-regulating force even in a state where no voltage is applied between the first electrode and the second electrode.

In one preferred embodiment, the first orientation-regulating structure includes a protrusion protruding from the second substrate toward the liquid crystal layer.

In one preferred embodiment, the first orientation-regulating structure includes a surface having a horizontal alignment power which is provided on one surface of the second substrate which is closer to the liquid crystal layer.

In one preferred embodiment, the first orientation-regulating structure includes a surface which is provided on one surface of the second substrate that is closer to the liquid crystal layer and which inclines the liquid crystal molecules in the liquid crystal layer at an angle smaller than that of the vertical alignment.

In one preferred embodiment, the first orientation-regulating structure exerts the orientation-regulating force only in a state where a voltage is applied between the first electrode and the second electrode.

In one preferred embodiment, the first orientation-regulating structure includes an opening provided in the second electrode.

In one preferred embodiment, the second substrate includes a second orientation-regulating structure in an area corresponding to each of the plurality of unit solid portions, the second orientation-regulating structure exerting an orientation-regulating force for placing the liquid crystal molecules in the liquid crystal domain formed in correspondence with each of the plurality of unit solid portions into a radially-inclined orientation at least in a state where a voltage is applied between the first electrode and the second electrode.

Preferably, the second orientation-regulating structure is provided in an area corresponding to a central portion or the vicinity thereof of each of the plurality of unit solid portions.

Preferably, in the liquid crystal domain formed in correspondence with each of the plurality of unit solid portions, an orientation-regulating direction provided by the second orientation-regulating structure matches a direction of the radially-inclined orientation provided by the oblique electric field.

In one preferred embodiment, the second orientation-regulating structure exerts the orientation-regulating force even in a state where no voltage is applied between the first electrode and the second electrode.

In one preferred embodiment, the second orientation-regulating structure includes a protrusion protruding from the second substrate toward the liquid crystal layer.

In one preferred embodiment, the second orientation-regulating structure includes a surface having a horizontal alignment power which is provided on one surface of the second substrate which is closer to the liquid crystal layer.

In one preferred embodiment, the second orientation-regulating structure includes a surface which is provided on one surface of the second substrate that is closer to the liquid crystal layer and which inclines the liquid crystal molecules in the liquid crystal layer at an angle smaller than that of the vertical alignment.

In one preferred embodiment, the second orientation-regulating structure exerts the orientation-regulating force only in a state where a voltage is applied between the first electrode and the second electrode.

In one preferred embodiment, the second orientation-regulating structure includes an opening provided in the second electrode.

Preferably, the plurality of unit solid portions each have a shape having rotational symmetry.

In one preferred embodiment, the plurality of unit solid portions are each generally star-shaped with four-fold rotational symmetry.

Preferably, the plurality of unit solid portions have substantially the same shape and substantially the same size as one another, and form at least one unit lattice arranged to have rotational symmetry.

Preferably, at least a part of the plurality of openings have substantially the same shape and substantially the same size as one another, and form at least one unit lattice arranged to have rotational symmetry.

Preferably, the at least the part of the plurality of openings each have a shape having rotational symmetry.

The first substrate may further include a dielectric layer provided on one surface of the first electrode, the one surface being farther from the liquid crystal layer, and a third electrode opposing at least a part of the at least one opening of the first electrode with the dielectric layer interposed therebetween.

In one preferred embodiment, the first substrate further includes a switching device provided in correspondence with each of the plurality of picture element regions; and the first electrode is a picture element electrode provided in each of the plurality of picture element regions and switched by the switching device, and the second electrode is at least one counter electrode opposing the plurality of picture element electrodes.

Alternatively, a liquid crystal display device according to the present invention comprises a first substrate, a second substrate, and a liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer interposed therebetween. In each of the plurality of picture element regions, the liquid crystal layer is in a vertical orientation state when no voltage is applied between the first electrode and the second electrode. In each of the plurality of picture element regions, the first electrode includes a plurality of openings, a plurality of generally star-shaped conductive portions each having four acute corners, and a plurality of connecting portions each for connecting four conductive portions of the plurality of conductive portions to one another via the corners. The second substrate includes a protrusion in an area corresponding to each of the plurality of connecting portions, the protrusion protruding toward the liquid crystal layer. Owing to this, the above-described objective is achieved.

In one preferred embodiment, the second substrate includes another protrusion in an area corresponding to each of the plurality of conductive portions, the protrusion protruding toward the liquid crystal layer.

Alternatively, a liquid crystal display device comprises a first substrate, a second substrate, and a liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer interposed therebetween. In each of the plurality of picture element regions, the liquid crystal layer is in a vertical alignment when no voltage is applied between the first electrode and the second electrode. In each of the plurality of picture element regions, the first electrode includes a plurality of openings, a plurality of generally star-shaped conductive portions each having four acute corners, and a plurality of connecting portions each for connecting four conductive portions of the plurality of conductive portions to one another via the corners. The second substrate includes an opening provided in an area corresponding to each of the plurality of connecting portions. Owing to this, the above-described objective is achieved.

In one preferred embodiment, the second substrate includes another opening provided in an area corresponding to each of the plurality of conductive portions.

Hereinafter, the functions of the present invention will be described.

In a liquid crystal display device according to the present invention, one of a pair of electrodes for applying a voltage to a liquid crystal layer in a picture element region has a plurality of openings (portions in the electrode where the conductive film is not provided) and a solid portion (a portion in the electrode excluding the openings, i.e., a portion in the electrode where the conductive film is provided). The solid portion of the electrode has a plurality of unit solid portions (conductive portions), and the plurality of unit solid portions are connected to one another via a connecting portion. The liquid crystal layer is in a vertical alignment in the absence of an applied voltage. In the presence of an applied voltage, the liquid crystal layer forms a plurality of liquid crystal domains taking a radially-inclined orientation by an oblique electric field produced in edge portions of the openings of the electrode. Typically, the liquid crystal layer is formed of a liquid crystal material having a negative dielectric anisotropy, and is orientation-regulated by vertical alignment layers (for example, vertical alignment films) provided at both ends thereof.

The liquid crystal domains produced by the oblique electric field are formed in areas corresponding to the openings and the solid portion of the electrode. The orientation of each of the liquid crystal domains is changed in accordance with the voltage, and thus a display is realized. Typically, a liquid crystal domain is formed in correspondence with each of the plurality of openings and each of the plurality of unit solid portions. Since each liquid crystal domain takes a radially-inclined orientation, the orientation of a high degree of rotational symmetry can be formed. Therefore, the viewing angle dependence of the display quality can be alleviated and a wide viewing angle characteristic can be realized.

The liquid crystal domain formed above the opening and the liquid crystal domain formed above the solid portion are formed by the oblique electric field produced in the edge portions of the opening. Therefore, these liquid crystal domains are adjacent to each other and alternately located. The orientations of the liquid crystal molecules in the adjacent liquid crystal domains are essentially continuous with each other. Accordingly, no disclination line is generated between the liquid crystal domain formed above the opening and the liquid crystal domain formed above the solid portion. The display quality does not decline due to the disclination line, and the stability of the orientation of the liquid crystal molecules is high.

In a liquid crystal display device according to the present invention, the liquid crystal molecules take a radially-inclined orientation in a region corresponding to the opening as well as a region corresponding to the solid portion of the picture element electrode. Therefore, the orientation continuity of the liquid crystal molecules is high as compared to the above-described conventional liquid crystal display device. Thus, a stable orientation is realized and a uniform display without roughness is obtained. Especially, in order to realize a superb response characteristic (high response speed), it is preferable that the oblique electric field for controlling the orientation of the liquid crystal molecules acts upon a large number of liquid crystal molecules. For realizing this, it is preferable to form a large number of openings (edge portions). In a liquid crystal display device according to the present invention, liquid crystal domains taking a stable radially-inclined orientation are formed in correspondence with the openings. Owing to this, even a large number of openings are formed in order to improve the response characteristic, the accompanying decline in the display quality (generation of roughness) can be suppressed.

Also in a liquid crystal display device according to the present invention, a second substrate, opposing a first substrate including the electrode for producing the oblique electric field with the liquid crystal layer interposed therebetween, has a first orientation-regulating structure in an area corresponding to a connecting portion for connecting three or more unit solid portions to one another. The first orientation-regulating structure places the liquid crystal molecules in the liquid crystal layer above the connecting portion into a radially-inclined orientation at least in the presence of an applied voltage. Owing to this, the orientation of the liquid crystal molecules above the connecting portion is stabilized. Therefore, the reduction in the display quality caused by the disturbance of the orientation in the liquid crystal layer above the connecting portion is suppressed, and a high quality display is realized.

Upon the liquid crystal layer above the connecting portion, the orientation-regulating force provided by the oblique electric field produced in the edge portions of the opening does not act almost at all in the direction (azimuth) in which the connecting portion is continuous with the unit solid portions. In the liquid crystal layer above a connecting portion for connecting three or more unit solid portions, there are a large number of such directions (azimuths). Therefore, without the first orientation-regulating structure described above, the orientation in the liquid crystal layer above the connecting portion is likely to become unstable. This lowers the display quality.

In order to improve the stability of the orientation and thus improve the display quality, it is preferable that liquid crystal domains taking a radially-inclined orientation are formed by the orientation-regulating force exerted by the first orientation-regulating structure also in areas corresponding to the connecting portions.

As a larger number of unit solid portions are connected to one another by one connecting portion, there are a larger number of directions (azimuths) in which the connecting portion is continuous with the unit solid portions. For this reason, the present invention is especially preferably used in the case where one connecting portion connects four or more unit solid portions.

In the case where the unit solid portions of the electrode each have a plurality of corners, the connecting portion may connect the unit solid portions to one another via the corners. The number of corners of one unit solid portion is typically four.

Where the corners of the unit solid portion are acute, a larger number of side edges of the electrode for producing an oblique electric field are formed. Therefore, the oblique electric field can act upon a larger number of liquid crystal molecules. As a result, a larger number of liquid crystal molecules initially incline in response to the electric field. This shortens the time required for forming radially-inclined orientations in the entire picture element region. For this reason, the response speed is improved. Also in the case where the corners are acute, the distance from a side edge of the electrode to the center of the unit solid portion is shorter. Therefore, the time required for the liquid crystal molecules corresponding to the unit solid portion to fall by the influence of the liquid crystal molecules inclined in an edge portion is shortened. For this reason also, a superb response characteristic is obtained.

The first orientation-regulating structure only needs to exert an orientation-regulating force at least in the presence of an applied voltage in order to provide an effect of stabilizing the orientation. In a structure where the first orientation-regulating structure exerts an orientation-regulating force even in the absence of an applied voltage, there is an advantage that the orientation can be stabilized regardless of the magnitude of the applied voltage. Since the orientation-regulating force of the first orientation-regulating structure provides an effect even if it is relatively weak, the orientation can be sufficiently stabilized even with a structure which is small as compared to the size of the picture element. Since the orientation-regulating force of the first orientation-regulating structure can be weaker than the orientation-regulating provided by the electrode including the unit solid portions, various arrangements can be used for the first orientation-regulating structure.

The first orientation-regulating structure is, for example, a protrusion protruding from the second substrate toward the liquid crystal layer. The protrusion can exert an orientation-regulating force even in the absence of an applied voltage. Such a protrusion can be produced by a simple process, which is preferable in terms of productivity. The first orientation-regulating structure may be include a surface having a horizontal alignment power, which is provided on a surface of the second substrate which is closer to the liquid crystal layer. The first orientation-regulating structure may include a surface which is provided on one surface of the second substrate that is closer to the liquid crystal layer and which inclines the liquid crystal molecules in the liquid crystal layer at an angle smaller than that of the vertical alignment ("surface having an inclining orientation power"). Alternatively, the first orientation-regulating structure may be an opening provided in the electrode. These can be produced by known methods.

The second substrate may include a second orientation-regulating structure in an area corresponding to each of the plurality unit solid portions. The second orientation-regulating structure exerts an orientation-regulating force for placing the liquid crystal molecules in the liquid crystal domain formed above each unit solid portion into a radially-inclined orientation at least in the presence of an applied voltage. In this case, at least in the presence of an applied voltage, the orientation-regulating force provided by the electrode including the unit solid portions and the second orientation-regulating structure acts upon the liquid crystal molecules in the liquid crystal domains. In consequence, the radially-inclined orientation of the liquid crystal domain is further stabilized, and the reduction in the display quality (for example, the generation of an after image) due to a stress applied to the liquid crystal layer is suppressed.

Where the second orientation-regulating structure is provided in an area corresponding to the center of the unit solid portion or the vicinity thereof, the position of the central axis of the radially-inclined orientation can be fixed. Therefore, the resistance of the radially-inclined orientation against a stress is effectively improved.

In the liquid crystal domains formed in correspondence with the unit solid portions, the orientation-regulating direction provided by the second orientation-regulating structure may be set to match the direction of the radially-inclined orientation provided by the oblique electric field. In this case, the orientation continuity and stability are increased. Thus, the display quality and the response characteristic are improved.

The second orientation-regulating structure only needs to exert an orientation-regulating force at least in the presence of an applied voltage in order to provide an effect of stabilizing the orientation. In a structure where the second orientation-regulating structure exerts an orientation-regulating force even in the absence of an applied voltage, there is an advantage that the orientation can be stabilized regardless of the magnitude of the applied voltage. Since the orientation-regulating force of the second orientation-regulating structure provides an effect even if it is relatively weak, the orientation can be sufficiently stabilized even with a structure which is small as compared to the size of the picture element. Since the orientation-regulating force of the second orientation-regulating structure can be weaker than the orientation-regulating force of the electrode including the unit solid portions, various arrangements can be used for the second orientation-regulating structure.

The second orientation-regulating structure is, for example, a protrusion protruding from the second substrate toward the liquid crystal layer. The protrusion can exert an orientation-regulating force even in the absence of an applied voltage. Such a protrusion can be produced by a simple process, which is preferable in terms of productivity. The second orientation-regulating structure may be include a surface having a horizontal alignment power, which is provided on one surface of the second substrate which is closer to the liquid crystal layer. The second orientation-regulating structure may include a surface which is provided on one surface of the second substrate that is closer to the liquid crystal layer and which inclines the liquid crystal molecules in the liquid crystal layer at an angle smaller than that of the vertical alignment ("surface having an inclining orientation power"). Alternatively, the second orientation-regulating structure may be an opening provided in the electrode. These can be produced by known methods.

Where the shape of the unit solid portion (the shape as viewed in a direction normal to a substrate) has rotational symmetry, the stability of the radially-inclined orientation of the liquid crystal domain formed in a region corresponding to the unit solid portion can be improved. In order to reduce the viewing angle dependence of the liquid crystal domain, the shape of the unit solid portion preferably has a high degree of rotational symmetry (preferably with at least a two-fold rotation axis, and more preferably with at least a four-fold rotation axis).

The unit solid portion has, for example, a generally star-like shape, which is obtained by bending or curving side edges of a rectangle inward. The generally star-shaped unit solid portion preferably has two-hold rotational symmetry (having a four-fold rotation axis), and more preferably has four-hold rotational symmetry (having a four-fold rotation axis).

In one arrangement, a plurality of unit solid portions have substantially the same shape and substantially the same size as one another, and form at least one unit lattice arranged to have rotational symmetry. With this arrangement, a plurality of liquid crystal domains can be arranged at a high degree of symmetry using the unit lattice as the unit. Therefore, the viewing angle dependence of the display quality can be alleviated. Where the entirety of the picture element region is divided into unit lattices, the orientation in the liquid crystal layer can be stabilized throughout the picture element region. For example, a plurality of unit solid portions can be arranged such that the centers of unit solid portions form a square lattice. In the case where one picture element region is divided by an opaque element such as a storage capacitance line, a unit lattice can be located for each area contributing to the display.

In one arrangement, at least some of the plurality of openings have substantially the same shape and substantially the same size as one another, and form at least one unit lattice arranged to have rotational symmetry. With this arrangement, a plurality of liquid crystal domains can be arranged at a high degree of symmetry using the unit lattice as the unit. Therefore, the viewing angle dependence of the display quality can be alleviated. Where the entirety of the picture element region is divided into unit lattices, the orientation in the liquid crystal layer can be stabilized throughout the picture element region. For example, the openings can be arranged such that the centers of the openings form a square lattice. In the case where one picture element region is divided by an opaque element such as a storage capacitance line, a unit lattice can be located for each area contributing to the display.

Where the shape (the shape as viewed in a direction normal to a substrate) of each of the some of the plurality of openings (typically, the openings forming a unit lattice) has rotational symmetry, the stability of the radially-inclined orientation of the liquid crystal domains formed in regions corresponding to the openings can be improved. In order to reduce the viewing angle dependence of the liquid crystal domain, the shape of the opening preferably has a high degree of rotational symmetry (preferably with at least a two-fold rotation axis, and more preferably with at least a four-fold rotation axis).

The opening has, for example, a generally rhombic shape. Alternatively, the opening may have a generally biangular shape with arcs (a so-called almond shape) obtained by combining two arc-like side edges (typically, minor arcs).

In the above-described electrode structure in which one of a pair of electrodes has openings, there may be a problem that the light utilization factor is lowered because a sufficient retardation change is not obtained due to a sufficient level of voltage not being applied across regions of liquid crystal layer corresponding to the openings. This can be solved by the following arrangement. A dielectric layer is provided on one surface of the electrode having the openings, the one surface being farther from the liquid crystal layer, and another electrode is provided so as to oppose at least a part of each opening of the electrode with the dielectric layer interposed therebetween (i.e., a two-layer electrode is provided). With such a structure, a sufficient level of voltage can be applied across the regions of the liquid crystal layer corresponding to the openings. As a result, the light utilization factor and the response characteristic can be improved.

A liquid crystal display device according to the present invention is, for example, an active matrix liquid crystal display device including a switching device such as a TFT in each picture element region. The above-described electrode including the openings is a picture element electrode connected to the switching device, and the other electrode is at least one counter electrode opposing the plurality of picture element electrodes.

BRIEF DESCRIPTION OF DRAWINGS

FIG. 1(a) and FIG. 1(b) schematically show a structure of one picture element region of a liquid crystal display device 100 according to the present invention, wherein FIG. 1(a) is a plan view, and FIG. 1(b) is a cross-sectional view taken along line 1B-1B' in FIG. 1(a).

FIG. 3(a) through FIG. 3(d) schematically show the relationship between an electric force line and an orientation of liquid crystal molecules.

FIG. 4(a) through FIG. 4(c) schematically show an orientation of liquid crystal molecules in the liquid crystal display device 100 as viewed in a direction normal to a substrate.

FIG. 5(a) through FIG. 5(c) schematically show exemplary radially-inclined orientations of liquid crystal molecules.

FIG. 6(a), FIG. 6(b) and FIG. 6(c) schematically show a structure of one picture element region of a liquid crystal display device 1000 which includes no orientation-regulating structure in any area corresponding to a connecting portion, wherein FIG. 6(a) is a plan view, FIG. 6(b) is a cross-sectional view taken along line 6B-6B' in FIG. 6(a), and FIG. 6(c) is a cross-sectional view taken along line 6C-6C' in FIG. 6(a).

FIG. 8(a) and FIG. 8(b) schematically show a cross-sectional structure of the liquid crystal display device 100 according to the present invention, wherein FIG. 8(a) is a cross-sectional view taken along line 8A-8A' in FIG. 1(a), and FIG. 8(b) is a cross-sectional view taken along line 8B-8B' in FIG. 1(a).

FIG. 13(a) and FIG. 13(b) schematically show a structure of one picture element region of another liquid crystal display device 200 according to the present invention, wherein FIG. 13(a) is a plan view, and FIG. 13(b) is a cross-sectional view taken along line 13B-13B' in FIG. 13(a).

FIG. 14(a), FIG. 14(b) and FIG. 14(c) schematically show a cross-sectional structure of one picture element region of the liquid crystal display device 200, wherein FIG. 14(a) shows a state in the absence of an applied voltage, FIG. 14(b) shows a state where the orientation has just started to change (initial ON state), and FIG. 14(c) shows a steady state.

FIG. 15(a) and FIG. 15(b) show a manner in which liquid crystal domains are formed in the liquid crystal layer 200 when a voltage is applied across the liquid crystal layer, wherein FIG. 15(a) shows a calculation result (simulation result) of the orientation of the liquid crystal molecules, FIG. 15(b) is a photograph of a liquid crystal panel actually produced, and FIG. 15(c) is a plan view schematically showing a structure of the region shown in FIG. 15(a).

FIG. 16(a) and FIG. 16(b) show a manner in which liquid crystal domains are formed in the case where the orientation-regulating structure above the connecting portion is omitted, wherein FIG. 16(a) shows a calculation result (simulation result) of the orientation of the liquid crystal molecules, FIG. 16(b) is a photograph of a liquid crystal panel actually produced, and FIG. 16(c) is a plan view schematically showing a structure of the region shown in FIG. 16(a).

FIG. 19(a) and FIG. 19(b) illustrate the function provided by acute corners of a unit solid portion.

FIG. 20(a) is a plan view showing unit solid portions with acute corners, and FIG. 20(b) and FIG. 20(c) are photographs obtained when a voltage of 6V is applied across the liquid crystal layer in a liquid crystal display device including a picture element electrode having the unit solid portions shown in FIG. 20(a), wherein FIG. 20(b) is obtained immediately after the voltage application, and FIG. 20(c) is obtained when the orientation of the liquid crystal molecules has reached a steady state (stable state).

FIG. 21(a) is a plan view showing unit solid portions, the corners of which are not acute, and FIG. 21(b) and FIG. 21(c) are photographs obtained when a voltage of 6V is applied across the liquid crystal layer in a liquid crystal display device including a picture element electrode having the unit solid portions shown in FIG. 21(a), wherein FIG. 21(b) is obtained immediately after the voltage application, and FIG. 21(c) is obtained when the orientation of the liquid crystal molecules has reached a steady state (stable state).

FIG. 23(a), FIG. 23(b) and FIG. 23(c) schematically show a cross-sectional structure of one picture element region of a liquid crystal display device 300 having a two-layer electrode, wherein FIG. 23(a) shows a state in the absence of an applied voltage, FIG. 23(b) shows a state where the orientation has just started to change (initial ON state), and FIG. 23(c) shows a steady state.

FIG. 24(a), FIG. 24(b) and FIG. 24(c) schematically show a cross-sectional structure of one picture element region of another liquid crystal display device 400 having a two-layer electrode, wherein FIG. 24(a) shows a state in the absence of an applied voltage, FIG. 24(b) shows a state where the orientation has just started to change (initial ON state), and FIG. 24(c) shows a steady state.

BEST MODE FOR CARRYING OUT THE INVENTION

Figure 2:
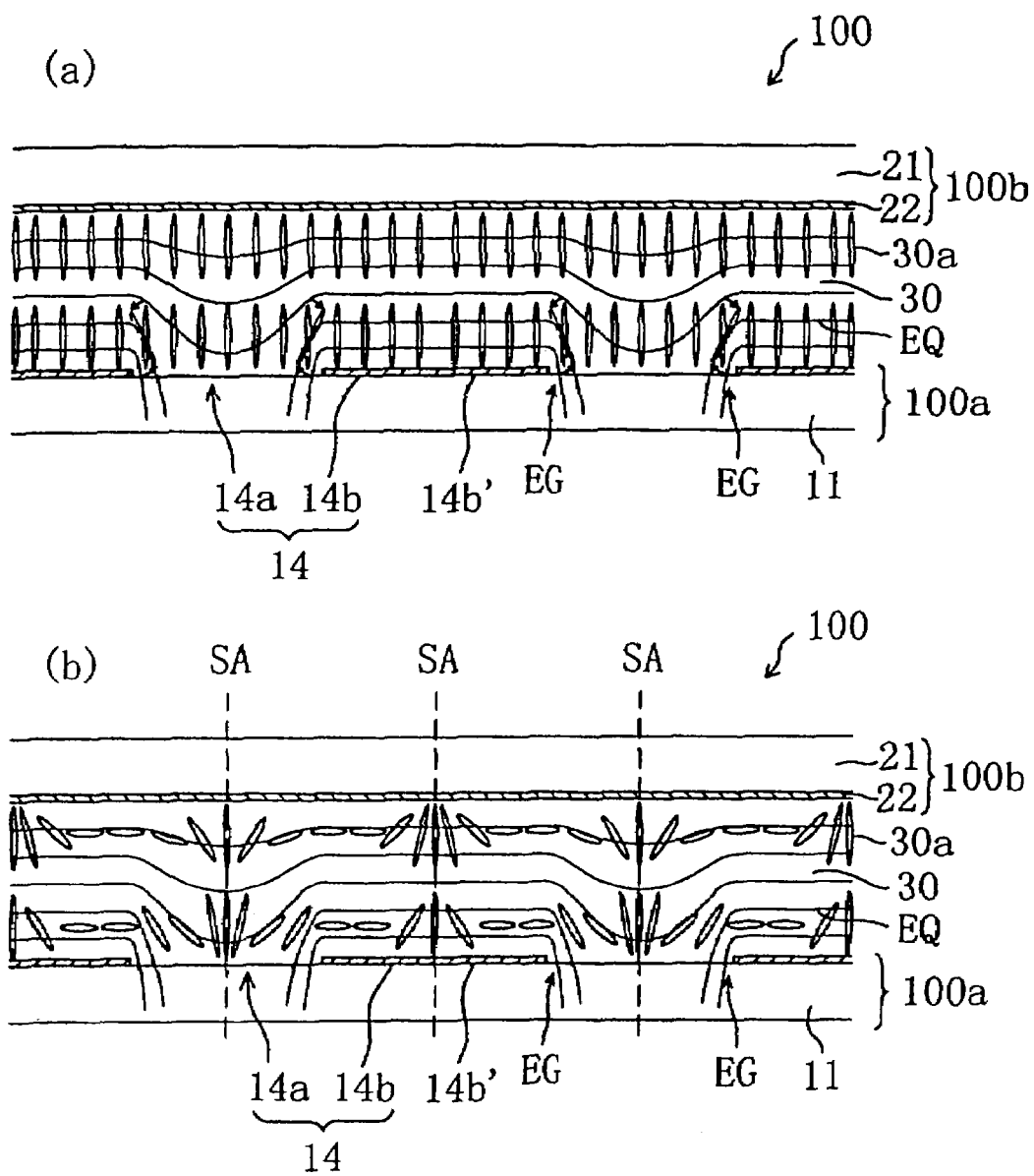
FIG. 2(a) and FIG. 2(b) show a state where a voltage is applied across a liquid crystal layer 30 in the liquid crystal display device 100, wherein FIG. 2(a) schematically shows a state where the orientation has just started to change (initial ON state), and FIG. 2(b) schematically shows a steady state.

Hereinafter, embodiments of the present invention will be described with reference to the accompanying drawings.

First, an electrode structure of a liquid crystal display device according to the present invention and functions thereof will be described. A liquid crystal display device according to the present invention has superb display characteristics and is preferably used for an active matrix liquid crystal display device. The following embodiments of the present invention will be described regarding an active matrix liquid crystal display device using thin film transistors (TFTs), but the present invention is not limited thereto and is also applicable to an active matrix liquid crystal display device using MIM or a passive matrix liquid crystal display device. The following embodiments of the present invention will also be described regarding a transmission type liquid crystal display device, but the present invention is not limited thereto and is also applicable to a reflection type liquid crystal display device or a transmission-reflection type liquid crystal display device.

Note that in this specification, a region of a liquid crystal display device corresponding to a "picture element", which is the minimum unit of display, will be referred to as a "picture element region". In a color liquid crystal display device, a plurality of "picture elements" including R, G and B "picture elements" correspond to one "pixel". In an active matrix liquid crystal display device, a picture element region is defined by a picture element electrode and an area of a counter electrode opposing the picture element electrode. In a passive matrix liquid crystal display device, a picture element region is defined by each of areas in which column electrodes provided in stripes and row electrodes provided to be perpendicular to the column electrodes cross each other. In an arrangement with a black matrix, strictly speaking, a picture element region is a portion, which opposes an opening of the black matrix, in a region across which a voltage is applied according to the intended display state.

With reference to FIG. 1(a) and FIG. 1(b), a structure of one picture element region of a liquid crystal display device 100 according to an embodiment of the present embodiment will be described. In the following description, a color filter and a black matrix are omitted for the sake of simplicity. In the figures, each element having substantially the same function as that of the corresponding element of the liquid crystal display device 100 will be represented by the same reference numeral and will not be further described. FIG. 1(a) is a plan view of the picture element region as viewed in a direction normal to a substrate, and FIG. 1(b) is a cross-sectional view thereof taken along line 1B-1B' in FIG. 1(a). FIG. 1(b) shows a state where no voltage is applied across a liquid crystal layer.

The liquid crystal display device 100 includes an active matrix substrate (hereinafter, referred to as a "TFT substrate") 100a, a counter substrate (referred to also as a "color filter substrate") 100b, and a liquid crystal layer 30 provided between the TFT substrate 100a and the counter substrate 100b. Liquid crystal molecules 30a in the liquid crystal layer 30 have a negative dielectric anisotropy. As shown in FIG. 1(b), when no voltage is applied across the liquid crystal layer 30, the liquid crystal molecules 30a are oriented vertical to a surface of, and by virtue of, a vertical alignment film (not shown). The vertical alignment film is provided as a vertical alignment layer on one surface of each of the TFT substrate 100a and the counter substrate 100b, the one surface being closer to the liquid crystal layer 30. This state of the liquid crystal layer 30 is referred to as a "vertical orientation state". The liquid crystal molecules 30a in the liquid crystal layer 30 in the vertical orientation state may be slightly inclined from the direction normal to the surface of the vertical alignment film (the substrate surface) depending on the type of vertical alignment film or the type of liquid crystal material used. Generally, a "vertical orientation state" is a state where the axis of liquid crystal molecules (referred to also as an "axial direction") is oriented at an angle of about 85 degrees or greater with respect to the surface of the vertical alignment film.

The TFT substrate 100a of the liquid crystal display device 100 includes a transparent substrate (for example, a glass substrate) 11 and a picture element electrode 14 provided on a surface thereof. The counter substrate 100b includes a transparent substrate (for example, a glass substrate) 21 and a counter electrode 22 provided on a surface thereof. The orientation in the liquid crystal layer 30 in each picture element region changes in accordance with the voltage applied between the picture element electrode 14 and the counter electrode 22, which are arranged to oppose each other with the liquid crystal layer 30 interposed therebetween. A display is realized by utilizing a phenomenon that the polarization state or amount of light passing through the liquid crystal layer 30 changes along with the change in the orientation in the liquid crystal layer 30.

The picture element electrode 14 of the liquid crystal display device 100 includes a plurality of openings 14a and a solid portion 14b. The picture element electrode 14 includes a conductive film (for example, an ITO film), and the openings 14a are areas of the picture element electrode 14 where the conductive film is not provided. The solid portion 14b is an area having the conductive film (i.e., the area other than the openings 14a). Each picture element electrode 14 includes a plurality of openings 14a, but the solid portion 14b is basically formed of one continuous conductive film. The square represented with the solid line in FIG. 1(a) shows an area (external shape) corresponding to a conventional picture element region formed of a single conductive layer.

The plurality of openings 14a are arranged such that the respective centers thereof form a square lattice pattern. A portion of the solid portion 14b', which is substantially surrounded by four openings 14a whose respective centers are located at the four lattice points that form one unit lattice (such a portion will be referred to as a "unit solid portion") 14b', is generally star-shaped with four vertexes and a four-fold rotation axis at the center among the four vertexes (namely, this portion has four-fold rotational symmetry). The openings 14a are generally rhombic and have substantially the same shape and substantially the same size as one another. In order to stabilize the orientation throughout the picture element region, it is preferable that unit lattices are formed up to ends of the picture element electrode 14. Accordingly, it is preferable that as shown in the figure, end portions of the picture element electrode are patterned to have shapes corresponding to a part of the opening 14a (for example, about a half thereof).

When a voltage is applied between the picture element electrode 14 having the above-described structure and the counter electrode 22, a plurality of liquid crystal domains each taking a radially-inclined orientation are formed by an oblique electric field produced in each edge portion of each opening 14a (a peripheral portion of each unit solid portion 14b'). One liquid crystal domain is formed in a region corresponding to each opening 14a, and one liquid crystal domain is formed in a region corresponding to each unit solid portion 14b'.

The external shape of the picture element electrode 14 is defined such that the solid portion 14b includes, in addition to the unit solid portions 14b' substantially surrounded by the openings 14a, portions having substantially the same size and substantially the same shape as those of the unit solid portions 14b'. The liquid crystal domains are also formed in regions corresponding to these areas. In this specification, these portions will also be referred to as "unit solid portions". Namely, a portion, in the solid portion 14b, which produces an electric field forming one liquid crystal domain will be referred to as a "unit solid portion". These unit solid portions 14b' are generally star-shaped and have substantially the same shape and substantially the same size as one another. In other words, the picture element electrode 14 includes a plurality of conductive portions each of which is star-shaped. Adjacent unit solid portions 14b' are connected to one another via a connecting portion 14d, and form the solid portion 14b acting as substantially a single conductive film. In this embodiment, each unit solid portion 14c has four acute corners 14c, and each connecting portion 14d connect the corners 14c. Namely, the connecting portion 14d connects the unit solid portions via the corners 14c.

With reference to FIG. 2(a) and FIG. 2(b), the mechanism by which liquid crystal domains are formed by the above-mentioned oblique electric field will be described. FIG. 2(a) and FIG. 2(b) each show a state where a voltage is applied across the liquid crystal layer 30 shown in FIG. 1(b). FIG. 2(a) schematically shows a state where the orientation of the liquid crystal molecules 30a has just started to change (initial ON state) in accordance with the voltage applied across the liquid crystal layer 30. FIG. 2(b) schematically shows a state where the orientation of the liquid crystal molecules 30a, which has been changing in accordance with the applied voltage, has reached a steady state. In FIG. 2(a) and FIG. 2(b), curves EQ represent equipotential lines.

As shown in FIG. 1(a), when the picture element electrode 14 and the counter electrode 22 are at the same potential (a state where no voltage is applied across the liquid crystal layer 30), the liquid crystal molecules 30a in the picture element region are oriented vertical to the surfaces of the substrates 11 and 21.

When a voltage is applied across the liquid crystal layer 30, a potential gradient represented by the equipotential lines EQ shown in FIG. 2(a) (perpendicular to the electric force line) is produced. The equipotential lines EQ are parallel to the surfaces of the solid portion 14b of the picture element electrode 14 and the counter electrode 22 in a region of the liquid crystal layer 30 which is between the solid portion 14b and the counter electrode 22. In a region of the liquid crystal layer 30 corresponding to the opening 14a of the picture element electrode 14, the equipotential lines EQ drop. As a result, an oblique electric field represented by an inclined portion of the equipotential lines EQ is produced in a region of the liquid crystal layer 30 above an edge portion EG of the opening 14a (a peripheral portion within the opening 14a including an external boundary of the opening 14a).

Upon the liquid crystal molecules 30a having a negative dielectric anisotropy, a torque acts to direct the axial direction of such liquid crystal molecules 30a to be parallel to the equipotential lines EQ (perpendicular to the electric force line). Accordingly, as represented by the arrows in FIG. 2(a), the liquid crystal molecules 30a above the right edge portion EG of each opening 14a incline (rotate) clockwise, and the liquid crystal molecules 30a above the left edge portion EG of each opening 14a incline (rotate) counterclockwise. As a result, the liquid crystal molecules 30a above the edge portions EG are oriented parallel to the corresponding portions of the equipotential lines EQ.

Referring to FIG. 3, the change in the orientation of the liquid crystal molecules 30a will be described in detail.

When an electric field is produced in the liquid crystal layer 30, a torque acts upon the liquid crystal molecules 30a having a negative dielectric anisotropy to direct the axial direction thereof to be parallel to the equipotential lines EQ. As shown in FIG. 3(a), when an electric field represented by an equipotential line EQ perpendicular to the axial direction of a liquid crystal molecule 30a is produced, either a torque urging the liquid crystal molecule 30a to incline clockwise or a torque urging the liquid crystal molecule 30a to incline counterclockwise is produced with the same probability. Therefore, in a region of the liquid crystal layer 30 which is between a pair of parallel plate-shape electrodes opposing each other, liquid crystal molecules 30a subjected to a clockwise torque and liquid crystal molecules 30a subjected to a counterclockwise torque both exist. As a result, the transition to the orientation in accordance with the voltage applied across the liquid crystal layer 30 may not proceed smoothly.

In FIG. 2(a), in the liquid crystal display device 100 of the present invention, an electric field represented by a portion of the equipotential lines EQ inclined with respect to the axial direction of the liquid crystal molecules 30a (an oblique electric field) is produced in each edge portion EG of each opening 14a. When this occurs, as shown in FIG. 3(b), the liquid crystal molecule 30a inclines in whichever direction that requires less inclination for the liquid crystal molecule 30a to be parallel to the equipotential line EQ (in the counterclockwise direction in the example of the figure). In FIG. 3(c), liquid crystal molecules 30a are located in a region where an electric field represented by an equipotential line EQ perpendicular to the axial direction thereof is produced. Such liquid crystal molecules 30a are inclined in the same direction as that of the liquid crystal molecule 30a located on the inclined portion of the equipotential line EQ, such that the orientation of the former liquid crystal molecules 30a is continuous (in conformity) with the orientation of the latter liquid crystal molecule 30a. In FIG. 3(d), an electric field represented by an equipotential line EQ having a continuous concave/convex pattern is applied. In this case, liquid crystal molecules 30a located on a flat portion of the equipotential line EQ are oriented so as to be in conformity with the orientation direction defined by the liquid crystal molecules 30a located on the adjacent inclined portions of the equipotential line EQ. The phrase "being located on an equipotential line EQ" as used herein means "being located within an electric field represented by the equipotential line EQ".

As described above, the liquid crystal molecules 30a change orientation thereof, starting from those located on the inclined portion of the equipotential lines EQ, and reach a steady state. Such a steady state is schematically shown in FIG. 2(b). The liquid crystal molecules 30a located above the center of the opening 14a and the vicinity thereof are influenced substantially equally by the respective orientations of the liquid crystal molecules 30a above the opposing edge portions EG of the opening 14a, and therefore are kept vertical to the equipotential lines EQ. The liquid crystal molecules 30a far from the center of the opening 14a are inclined by the influence of the orientation of the liquid crystal molecules 30a at the closer edge portion EG. In this manner, an inclined orientation symmetric about the center SA of the opening 14a is formed. In a direction perpendicular to the display surface of the liquid crystal display device 100 (a direction perpendicular to the surfaces of the substrates 11 and 21), such an orientation is viewed as a radial axial direction of the liquid crystal molecules 30a about the center of the opening 14a (not shown). In this specification, such an orientation will be referred to as a "radially-inclined orientation". In addition, a region of the liquid crystal layer 30 in which the liquid crystal molecules 30a take a radially-inclined orientation about a single axis will be referred to as a "liquid crystal domain".

A liquid crystal domain in which the liquid crystal molecules 30a take a radially-inclined orientation is formed also in a region corresponding to each unit solid portion 14b' which is substantially surrounded by the openings 14a. The liquid crystal molecules 30a in a region corresponding to each unit solid portion 14b' are influenced by the orientations of the liquid crystal molecules 30a above the edge portions EG of the openings 14a and take a radially-inclined orientation symmetric about the center SA of the unit solid portion 14b' (corresponding to the center of a unit lattice formed by the openings 14a).

The radially-inclined orientation of a liquid crystal domain formed above the unit solid portion 14b' and the radially-inclined orientation formed above the opening 14a are continuous with each other, and are both in conformity with the orientations of the liquid crystal molecules 30a above the edge portions EG of the openings 14b. The liquid crystal molecules 30a in the liquid crystal domain formed above the opening 14a are oriented in the shape of a cone that spreads upwardly (toward the substrate 100b), and the liquid crystal molecules 30a in the liquid crystal domain formed above the unit solid portion 14b' are oriented in the shape of a cone that spreads downwardly (toward the substrate 100a). As described above, the radially-inclined orientation in a liquid crystal domain formed above the opening 14a and the radially-inclined orientation in a liquid crystal domain formed above the unit solid portion 14b' are mutually continuous. Therefore, no disclination line (orientation defect) is formed along the boundary therebetween. This prevents the display quality from declining due to a disclination line.

In order to alleviate the viewing angle dependence of the display quality of a liquid crystal display device in all azimuth angles, the existence probabilities of the liquid crystal molecules oriented in various azimuth angle directions preferably have rotational symmetry. In other words, it is preferable that the liquid crystal domains formed in the entirety of the picture element region are arranged to have rotational symmetry. However, it is not absolutely necessary that the liquid crystal domains should have rotational symmetry in the entirety of the picture element region. The liquid crystal layer in the picture element region only needs to be formed as a set of liquid crystal domains which are arranged to have rotational symmetry (e.g., as a plurality of liquid crystal domains arranged in a square lattice pattern). Therefore, it is not absolutely necessary that the plurality of openings 14a in the picture element region should be arranged to have rotational symmetry in the entirety of the picture element region. The openings 14a only need to exist as a set of openings 14a which are arranged to have rotational symmetry (e.g., as a plurality of openings arranged in a square lattice pattern). The same is applicable to the unit solid portions 14b' substantially surrounded by the plurality of openings 14a. It is preferable that the shape of each liquid crystal domain has rotational symmetry. Accordingly, it is also preferable that the shape of each opening 14a and each unit solid portion 14b' have rotational symmetry.

Note that a sufficient level of voltage may not be applied across the liquid crystal layer 30 above the center of the opening 14a or the vicinity thereof, and as a result, the liquid crystal layer 30 in this region cannot contribute to the display. In other words, even if the radially-inclined orientation in the liquid crystal layer 30 above the center of the opening 14a and the vicinity thereof is disturbed to some extent (e.g., even if the central axis is shifted from the center of the opening 14a), the display quality may not decline. Therefore, at least the liquid crystal domains formed corresponding to the unit solid portions 14b' need to be arranged to have rotational symmetry.

As described above with reference to FIG. 2(a) and FIG. 2(b), the picture element electrode 14 of the liquid crystal display device 100 of the present invention has a plurality of openings 14a and produces an electric field, represented by equipotential lines EQ having inclined portions, in a region of the liquid crystal layer 30 corresponding to the picture element region. The liquid crystal molecules 30a having a negative dielectric anisotropy in the liquid crystal layer 30, which are in a vertical orientation state in the absence of an applied voltage, are triggered to change the orientation direction thereof by the change in the orientation of the liquid crystal molecules 30a located on the inclined portions of the equipotential lines EQ. As a result, liquid crystal domains having a stable radially-inclined orientation are formed above the openings 14a and the solid portion 14b. The orientation of the liquid crystal molecules in such a liquid crystal domain changes in accordance with the voltage applied across the liquid crystal layer. Thus, a display is realized.

Now, the shape (as viewed in a direction normal to a substrate) and arrangement of the openings 14a of the picture element electrode 14 of the liquid crystal display device 100 in this embodiment will be described.

The display characteristics of a liquid crystal display device exhibit an azimuth angle dependence due to the orientation state (optical anisotropy) of the liquid crystal molecules. In order to reduce the azimuth angle dependence of the display characteristics, it is preferable that the liquid crystal molecules are oriented in all azimuth angles with substantially the same probability. It is more preferable that the liquid crystal molecules in each picture element region are oriented in all azimuth angles with substantially the same probability. Accordingly, the openings 14a preferably have a shape which enables liquid crystal domains to be formed such that the liquid crystal molecules 30a in each picture element region are oriented in all azimuth angles with substantially the same probability. Specifically, the shape of each opening 14a preferably has rotational symmetry (more preferably, symmetry with at least a two-fold rotation axis) about a symmetry axis extending through the center of the opening 14a (in the normal direction). It is also preferable that the plurality of openings 14a are arranged to have rotational symmetry. The shape of each unit solid portion 14b' preferably has rotational symmetry. It is also preferable that the unit solid portions 14b' are arranged to have rotational symmetry.

It is not absolutely necessary that the openings 14a and the unit solid portions 14b' should be arranged to have rotational symmetry in the entirety of the picture element region. As shown in FIG. 1(a), the picture element region only needs to be formed of a combination of, for example, a plurality of square lattices (having symmetry with a four-fold rotation axis) as the minimum unit. With such an arrangement, the liquid crystal molecules can be oriented in all azimuth angles with substantially the same probability in the entirety of the picture element region.

With reference to FIG. 4(a) through FIG. 4(c), the orientation of the liquid crystal molecules 30a in the case where the generally cross-shaped openings 14a and the generally star-shaped unit solid portions 14b shown in FIG. 1(a) are arranged in a square lattice pattern so as to have rotational symmetry will be described.

FIG. 4(a) through FIG. 4(c) each schematically show an orientation of the liquid crystal molecules 30a as viewed in a direction normal to a substrate. In FIG. 4(b), FIG. 4(c) and any other figure illustrating the orientation of the liquid crystal molecules 30a as viewed in the direction normal to the substrate, a black-spotted end of a liquid crystal molecule 30a drawn as an ellipse indicates that the liquid crystal molecule 30a is inclined such that this end is closer than the other end to the substrate on which the picture element electrode 14 having the openings 14a is provided. This applies to all of the subsequent figures. Hereinafter, a single unit lattice (formed by four openings 14a) in the picture element region shown in FIG. 1(a) will be described. FIG. 1(b), FIG. 2(a) and FIG. 2(b) respectively correspond to cross-sectional views taken along respective diagonals of FIG. 4(a), FIG. 4(b) and FIG. 4(c). FIG. 1(b), FIG. 2(a) and FIG. 2(b) will also be referred to in the following description.

When the picture element electrode 14 and the counter electrode 22 are at the same potential, i.e., in a state where no voltage is applied across the liquid crystal layer 30, the liquid crystal molecules 30a, whose orientation direction is regulated by the vertical alignment layer (not shown) provided on one surface of each of the TFT substrate 100a and the counter substrate 100b which is closer to the liquid crystal layer 30, take a vertical orientation state as shown in FIG. 4(a).

When a voltage is applied across the liquid crystal layer 30 and an electric field represented by equipotential lines EQ shown in FIG. 2(a) is produced, a torque acts upon the liquid crystal molecules 30a having a negative dielectric anisotropy to direct the axial direction thereof to be parallel to the equipotential lines EQ. As described above with reference to FIG. 3(a) and FIG. 3(b), the direction of inclination (rotation) of the liquid crystal molecules 30a under an electric field represented by a portion of equipotential lines EQ perpendicular to the molecular axis thereof is not uniquely defined (FIG. 3(a)). Therefore, the orientation (inclination or rotation) thereof does not easily change. By contrast, the direction of inclination (rotation) of the liquid crystal molecules 30a on a portion of the equipotential lines EQ inclined with respect to the molecular axis thereof is uniquely defined. Therefore, the orientation thereof easily changes. As a result, as shown in FIG. 4(b), the liquid crystal molecules 30a incline, starting from those above the edge portions of the openings 14a where the molecular axis of the liquid crystal molecules 30a is inclined with respect to the equipotential lines EQ. Next, as described above with reference to FIG. 3(c), the surrounding liquid crystal molecules 30a also incline so as to be in conformity with the orientation of the liquid crystal molecules 30a above the edge portions of the openings 14a. Then, as shown in FIG. 4(c), the axial direction of the liquid crystal molecules 30a is stabilized (radially-inclined orientation).

As described above, where the shape of the openings 14a has rotational symmetry, upon application of a voltage, the liquid crystal molecules 30a in the picture element region successively incline. First, those above the edge portions of the openings 14a incline, and then those above the center of the openings 14a also incline. The orientation-regulating forces from the liquid crystal molecules 30a above the edge portions of the opening 14a act upon the liquid crystal molecules 30a above the center of each opening 14a and the vicinity thereof in an equilibrium manner. Therefore, the liquid crystal molecules 30a above the center of each opening 14a and the vicinity thereof are kept vertical to the substrate surface. The surrounding liquid crystal molecules 30a are inclined in a radial pattern about the liquid crystal molecules 30a above the center of each opening 14a and the vicinity thereof. The degree of inclination gradually increases as the liquid crystal molecules 30a are farther from the center of the opening 14a.

The liquid crystal molecules 30a, in a region corresponding to the generally star-shaped unit solid portion 14b', also incline so as to be in conformity with the orientation of the liquid crystal molecules 30a which have been inclined by an oblique electric field produced in each edge portion of each opening 14a. The orientation-regulating forces from the liquid crystal molecules 30a above the edge portions of the unit solid portion 14b' act upon the liquid crystal molecules 30a above the center of each unit solid portion 14b' and the vicinity thereof in an equilibrium manner. Therefore, the liquid crystal molecules 30a above the center of each unit solid portion 14b' and the vicinity thereof are kept vertical to the substrate surface. The surrounding liquid crystal molecules 30a are inclined in a radial pattern about the liquid crystal molecules 30a above the center of the unit solid portion 14b' and the vicinity thereof. The degree of inclination gradually increases as the liquid crystal molecules 30a are farther from the center of the unit solid portion 14b'.

As described above, when liquid crystal domains, in each of which the liquid crystal molecules 30a take a radially-inclined orientation, are arranged in a square lattice pattern in the entirety of the picture element region, the existence probabilities of the liquid crystal molecules 30a of the respective axial orientations have rotational symmetry. As a result, a high-quality display without rough non-uniformity can be realized at any viewing angle. In order to reduce the viewing angle dependence of a liquid crystal domain taking a radially-inclined orientation, the liquid crystal domain preferably has a high degree of rotational symmetry (preferably with at least a two-fold rotation axis, and more preferably with at least a four-fold rotation axis). In order to reduce the viewing angle dependence of the entire picture element region, the plurality of liquid crystal domains formed in the picture element region preferably form an arrangement (for example, a square lattice) represented as a combination of units (for example, unit lattices) having a high degree of rotational symmetry (preferably with at least a two-fold rotation axis, and more preferably with at least a four-fold rotation axis).

Regarding the stability of a radially-inclined orientation of the liquid crystal molecules 30a, the radially-inclined orientation having a counterclockwise or clockwise spiral pattern as shown in FIG. 5(b) or FIG. 5(c) respectively is more stable than the simple radially-inclined orientation as shown in FIG. 5(a). Such a spiral orientation is different from a normal twist orientation in which the orientation direction of the liquid crystal molecules 30a spirally changes along the thickness of the liquid crystal layer 30. In the spiral orientation, the orientation direction of the liquid crystal molecules 30a does not substantially change along the thickness of the liquid crystal layer 30 when viewed in a minute area. In other words, the orientation in a cross section (along a plane parallel to the layer surface) at any point along the thickness of the liquid crystal layer 30 is as shown in FIG. 5(b) or FIG. 5(c). There is substantially no twist deformation along the thickness of the liquid crystal layer 30. When viewed in a liquid crystal domain as a whole, however, there is a certain degree of twist deformation.

When a material obtained by adding a chiral agent to a nematic liquid crystal material having a negative dielectric anisotropy is used, upon application of a voltage, the liquid crystal molecules 30a take a radially-inclined orientation of a counterclockwise or clockwise spiral pattern about the opening 14a and the unit solid portion 14b', as shown in FIG. 5(b) or FIG. 5(c), respectively. Whether the spiral pattern is counterclockwise or clockwise is determined by the type of chiral agent used. By controlling the liquid crystal layer 30 above the opening 14a to obtain a radially-inclined orientation of a spiral pattern upon application of a voltage, the direction of the spiral pattern of the radially-inclined liquid crystal molecules 30a, surrounding the liquid crystal molecules 30a oriented vertical to the substrate surface, can be made uniform in all the liquid crystal domains. Therefore, a uniform display without roughness can be realized. Since the direction of the spiral pattern of the liquid crystal molecules 30a surrounding the liquid crystal molecules 30a aligned vertical to the substrate surface is definite, the response speed upon application of a voltage across the liquid crystal layer 30 is also increased.

In addition, when a sufficiently large amount of chiral agent is added, the orientation of the liquid crystal molecules 30a changes in a spiral pattern along the thickness of the liquid crystal layer 30 as in a normal twisted orientation. Where the orientation of the liquid crystal molecules 30a does not change in a spiral pattern along the thickness of the liquid crystal layer 30, the liquid crystal molecules 30a which are oriented vertical or parallel to the polarization axis of the polarization plate do not give a phase difference to incident light. Therefore, the incident light passing through a region of such an orientation does not contribute to the transmittance. By contrast, where the orientation of the liquid crystal molecules 30a changes in a spiral pattern along the thickness of the liquid crystal layer 30, the liquid crystal molecules 30a oriented vertical or parallel to the polarization axis of the polarization plate also give a phase difference to incident light, and the optical rotatory power can also be utilized. Therefore, the incident light passing through a region of such an orientation also contributes' to the transmittance. Thus, a liquid crystal display device capable of realizing a bright display is provided.

As described above, the liquid crystal display device 100 forms liquid crystal domains taking a radially-inclined orientation by the picture element electrode 14 provided in the TFT substrate 100a, and can provide a display with a wide viewing angle. However, with mere provision of the picture element electrode 14 having the above-described structure in the TFT substrate 100a, the orientation in regions of the liquid crystal layer 30 which are above the connecting portions 14d of the picture element electrode 14 is unstable. This may lower the display quality.

As shown in FIG. 1(a), the liquid crystal display device 100 according to the present invention includes orientation-regulating structures 28 in areas of the counter substrate 100b corresponding to the connecting portions 14d. Therefore, the orientation in the regions of the liquid crystal layer 30 which are above the connecting portions 14d is stabilized, and thus a high quality display is provided. Hereinafter, a specific structure and function of the orientation-regulating structure 28 will be described. Before that, the reason why the orientation in the regions of the liquid crystal layer 30 which are above the connecting portions 14d is unstable will be described.

Figure 6:
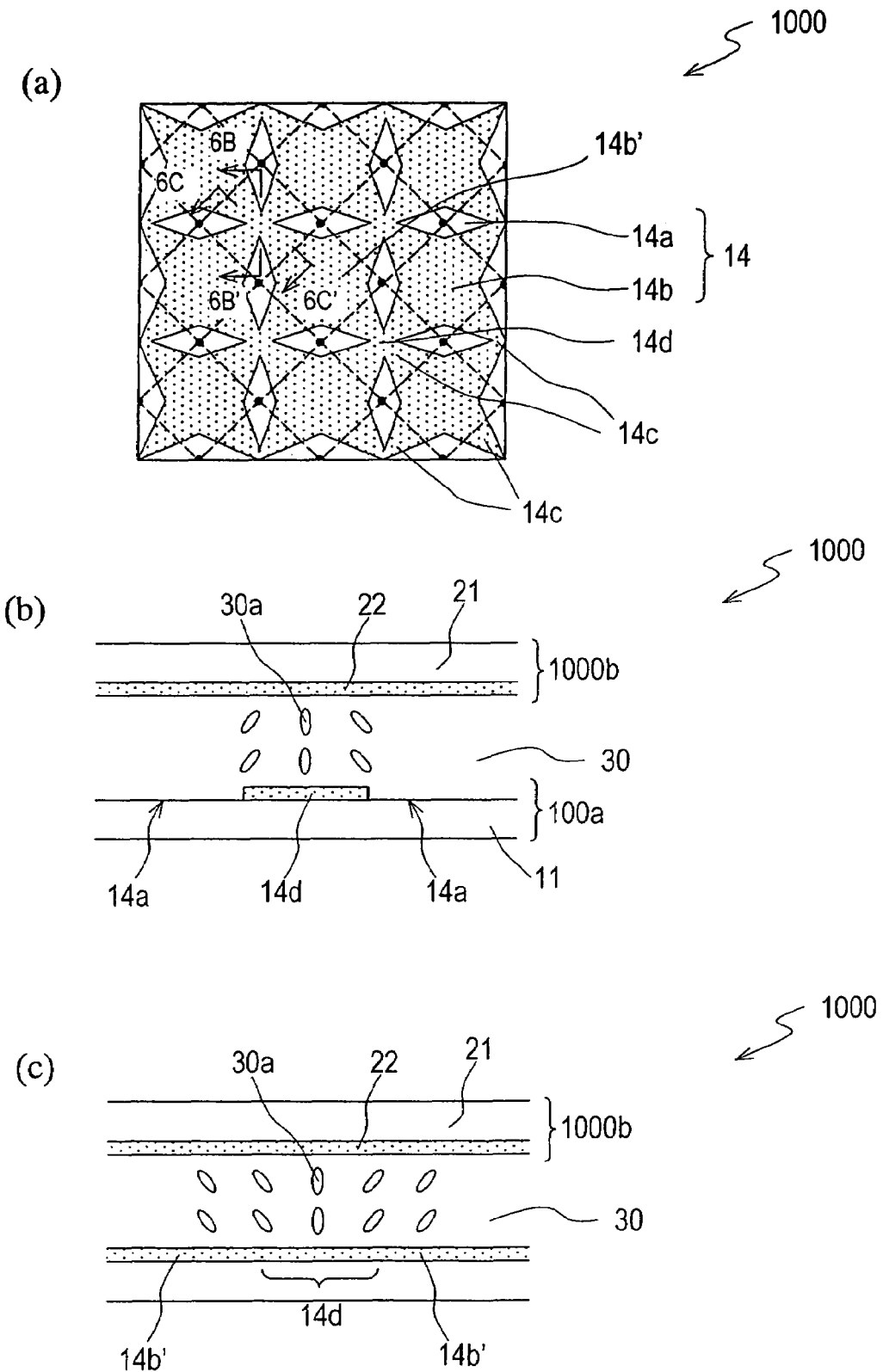

FIG. 6(a) through FIG. 6(c) schematically show a liquid crystal display device 1000 which includes no orientation-regulating structure in any area corresponding to the connecting portion of the picture element electrode. FIG. 6(a) is a plan view showing a structure of one picture element region of the liquid crystal display device 1000. FIG. 6(b) is a cross-sectional view thereof taken along line 6B-6B' in FIG. 6(a), and FIG. 6(c) is a cross-sectional view thereof taken along line 6C-6C' in FIG. 6(a). In FIG. 6(a) through FIG. 6(c), elements having substantially the same functions as those of the elements of the liquid crystal display device 100 bear the identical reference numerals thereto. FIG. 6(b) and FIG. 6(c) show a state where a voltage is applied across the liquid crystal layer 30.

As shown in FIG. 6(a) through FIG. 6(c), a counter substrate 1000b of the liquid crystal display device 1000 includes no orientation-regulating structure in any area corresponding to the connecting portion 14d of the picture element electrode 14.

In a direction along line 6B-6B' in FIG. 6(a), as shown in FIG. 6(b), the connecting portion 14d is adjacent to the openings 14a. Therefore, when a voltage is applied between the picture element electrode 14 and the counter electrode 22, the liquid crystal molecules 30a above the connecting portion 14d receive an orientation-regulating force provided by an oblique electric field produced in each edge portion of the opening 14a.

By contrast, in a direction along line 6C-6C' in FIG. 6(a), as shown in FIG. 6(c), the connecting portion 14d is continuous with the unit solid portions 14b'. Therefore, even when a voltage is applied between the picture element electrode 14 and the counter electrode 22, the liquid crystal molecules 30a above the connecting portion 14d are not influenced almost at all by the orientation-regulating force provided by the oblique electric field and are inclined so as to be in conformity with the orientation of the liquid crystal molecules 30a above the adjacent unit solid portions 14b'.

As described above, in the direction in which the connecting portion 14d is adjacent to the openings 14a, the liquid crystal molecules 30a above the connecting portion 14d receive a relatively strong orientation-regulating force provided by the oblique electric field. However, in the direction in which the connecting portion 14d is continuous with the unit solid portions 14b', the liquid crystal molecules 30a above the connecting portion 14d receive only such a weak orientation-regulating force that acts to keep the orientation continuity with the surrounding liquid crystal molecules 30a. In addition, as can be understood from FIG. 6(b) and FIG. 6(c), the orientation-regulating directions of the orientation-regulating forces exerted in these directions are opposite to each other. As shown in FIG. 6(b), in the direction in which the connecting portion 14d is adjacent to the openings 14a, the liquid crystal molecules 30a above the connecting portion 14d are oriented in the shape of a cone that spreads downwardly (toward the substrate 100a). By contrast, as shown in FIG. 6(c), in the direction in which the connecting portion 14d is continuous with the unit solid portions 14b', the liquid crystal molecules 30a above the connecting portion 14d are oriented in the shape of a cone that spreads upwardly (toward the substrate 100b).

As described above, there is a direction (azimuth) in which the liquid crystal molecules 30a above the connecting portion 14d do not receive an orientation-regulating force almost at all (rather receive an orientation-regulating force in the opposite direction). This is why the orientation in the liquid crystal layer 30 above the connecting portion 14d is likely to become unstable.

When the orientation in the liquid crystal layer 30 above the connecting portion 14d is disturbed, the disturbance influences the orientation of the liquid crystal domains formed above the adjacent unit solid portions 14b' and openings 14a. As a result, the stability of the orientation is lowered throughout the picture element region. Moreover, the orientation destabilization does not occur at the same degree in all the picture element regions, but at different degrees in different picture element regions. In consequence, the transmittance and the contrast ratio are varied in the display plane, which causes a non-uniform display or roughness.

The orientation in the regions of the liquid crystal layer which are above the connecting portions of the picture element electrode is more likely to become unstable in the case where one connecting portion connects three or more unit solid portions to one another than in the case where one connecting portion connects two unit solid portions to each other. The reason is that as a larger number of unit solid portions are connected by one connecting portion, there are a larger number of directions in which the connecting portion is continuous with the unit solid portions. Especially in the case where one connecting portion connects four or more unit solid portions to one another, the orientation is disturbed conspicuously and thus the display quality is lowered significantly.

Next, with reference to FIG. 7(a) through FIG. 7(d), a specific structure and function of an orientation-regulating structure will be described. FIG. 7(a) through FIG. 7(d) each schematically show a counter substrate 100b having an orientation-regulating structure 28.

An orientation-regulating structure 28 shown in each of FIG. 7(a) through FIG. 7(d) exerts an orientation-regulating force upon the liquid crystal molecules 30a in the liquid crystal layer 30 and acts to place the liquid crystal molecules 30a above the connecting portion 14d into a radially-inclined orientation, at least in a state where a voltage is applied between the picture element electrode 14 and the counter substrate 22.

Figure 7:
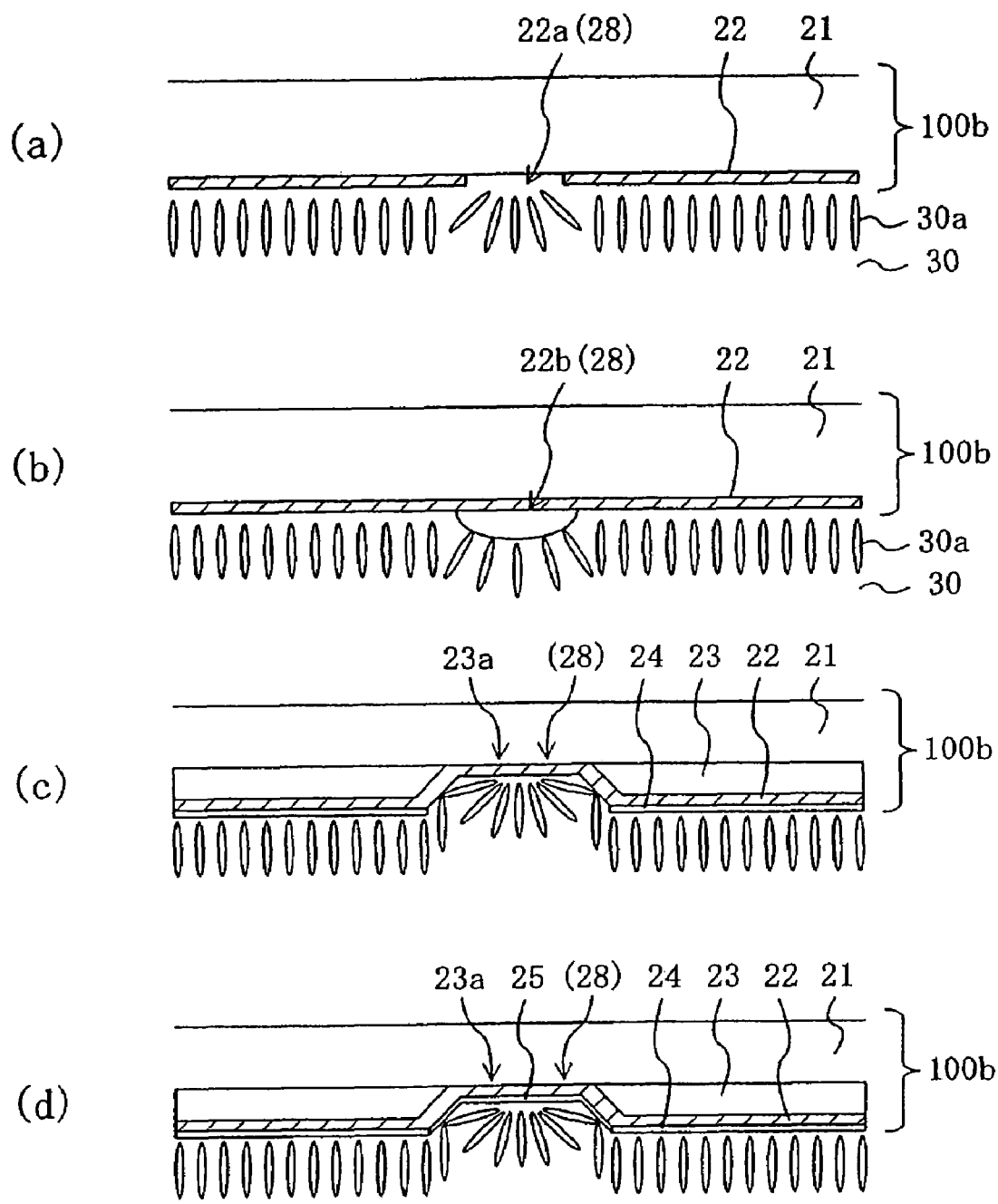
FIG. 7(a) through FIG. 7(d) are cross-sectional views schematically showing a counter substrate 100b having an orientation-regulating structure 28.

The orientation-regulating structure 28 shown in FIG. 7(a) is realized by an opening 22a of the counter electrode 22. A vertical alignment film (not shown) is provided on one surface of a counter substrate 300b which is closer to the liquid crystal layer 30.

The orientation-regulating structure 28 exerts an orientation-regulating force only in the presence of an applied voltage. The orientation-regulating structure 28 is only required to exert an orientation-regulating force upon the liquid crystal molecules 30a in a region of the liquid crystal layer 30 which is above the connecting portion 14d. Therefore, the size of the opening 22a may be smaller than the opening 14a in the picture element electrode 14 and may be smaller than the unit solid portion 14b' (see, for example, FIG. 1(a)). A sufficient effect can be provided with, for example, the opening 22a having an area size less than or equal to one half of that of the opening 14a or the unit solid portion 14b'. Where the opening 22a is provided in the counter electrode 22 such that the center thereof opposes the center of the connecting portion 14 of the picture element electrode 14, the continuity of the orientation of the liquid crystal molecules 30a increases, and the position of the central axis of the radially-inclined orientation can be fixed.

As described above, in the case where an orientation-regulating structure exerting an orientation-regulating force only in the presence of an applied voltage is adopted, almost all the liquid crystal molecules 30a in the liquid crystal layer 30 take a vertical orientation in the absence of an applied voltage. Therefore, in a normally black mode, almost no light leakage occurs in a black display state. This realizes a display with a superb contrast ratio. However, when the applied voltage is low, the orientation-regulating structure 28 realized by the opening 22a provided in the counter electrode 22 may not occasionally exert a sufficiently strong orientation-regulating force.

The orientation-regulating structure 28 shown in each of FIG. 7(b) through FIG. 7(d) exerts an orientation-regulating force regardless of the presence/absence of an applied voltage. Such an orientation-regulating structure 28 provides a stable radially-inclined orientation at any display gray level.

The orientation-regulating structure 28 shown in FIG. 7(b) has a protrusion 22b protruding toward the liquid crystal layer 30 from the counter electrode 22. Although there is no particular limitation on the material of the protrusion 22b, the protrusion 22b can be easily formed by using a dielectric material such as a resin. A vertical alignment film (not shown) is provided on one surface of the counter substrate 300b which is closer to the liquid crystal layer 30. The protrusion 22b places the liquid crystal molecules 30a into a radially-inclined orientation by the effect of the configuration of the surface thereof (the surface having a vertical alignment power). It is preferable to use a resin material deformable by heat, in which case the protrusion 22b having a mildly humped cross-section as shown in FIG. 7(b) can be easily formed by heat treatment performed after patterning. As shown in the figure, the protrusion 22b having a mildly humped cross-section with a vertex (for example, a part of a sphere) or a conical protrusion provides a superb effect of fixing the central position of the radially-inclined orientation.

The orientation-regulating structure 28 shown in FIG. 7(c) is realized by a horizontal alignment surface, opposing the liquid crystal layer 30, of an opening (or a recess) 23a formed in a dielectric layer 23 formed below the counter electrode 22 (i.e., on the side of the counter substrate 21). In this embodiment, the surface of the opening 23a is made a horizontal alignment surface by avoiding a vertical alignment film 24, formed on one surface of the counter substrate 300b which is closer to the liquid crystal layer 30, from being formed only in the opening 23a. Alternatively, as shown in FIG. 7(d), a horizontal alignment film 25 may be provided only in the opening 23a.

The horizontal alignment film shown in FIG. 7(d) may be provided by, for example, first forming the vertical alignment film 24 on the entire surface of the counter substrate 100b, and then selectively irradiating a part of the vertical alignment film 24 which is in the opening 23a with UV light so as to reduce the vertical alignment power thereof.

The horizontal alignment power required for forming the orientation-regulating structure 28 shown in each of FIG. 7(c) and FIG. 7(d) does not need to be so high that the resulting pretilt angle is as small as that resulting from an alignment film which is used in a TN type liquid crystal display device. For example, a pretilt angle of 45 degrees or less is acceptable. Even a surface which does not have a horizontal alignment power but can incline liquid crystal molecules at an angle smaller than that of the vertical alignment (referred to as a "surface having an inclining orientation power") can act as an orientation-regulating structure 28.

As shown in FIG. 7(c) and FIG. 7(d), on the horizontal alignment surface in the opening 23a, the liquid crystal molecules 30a are urged to be oriented horizontal with respect to the substrate surface. As a result, the liquid crystal molecules 30a take an orientation which is continuous with the orientation of the surrounding, vertically oriented liquid crystal molecules 30a on the vertical alignment film 24. Thus, the radially-inclined orientation as shown in each of FIG. 7(c) and FIG. 7(d) is obtained.

A radially-inclined orientation can be obtained only by selectively providing a horizontal alignment surface (for example, a surface of an electrode or a horizontal alignment film) on the flat surface of the counter electrode 22, without forming a recess (which is realized by the opening in the dielectric layer 23) in the surface of the counter electrode 22. Nonetheless, the recess has an effect of further stabilizing the radially-inclined orientation by virtue of the surface configuration thereof.

It is preferable to use, for example, a color filter layer or an overcoat layer of a color filter layer as the dielectric layer 23 in order to form a recess in the surface of the counter substrate 100b which is closer to the liquid crystal layer 30. In this manner, the number of production steps does not increase. In the structures shown in FIG. 7(c) and FIG. 7(d), no region of the liquid crystal layer 30 is supplied with a voltage via the protrusion 22b, unlike in the structure shown in FIG. 7(b). Therefore, the light utilization efficiency is reduced very little.

Figure 8:
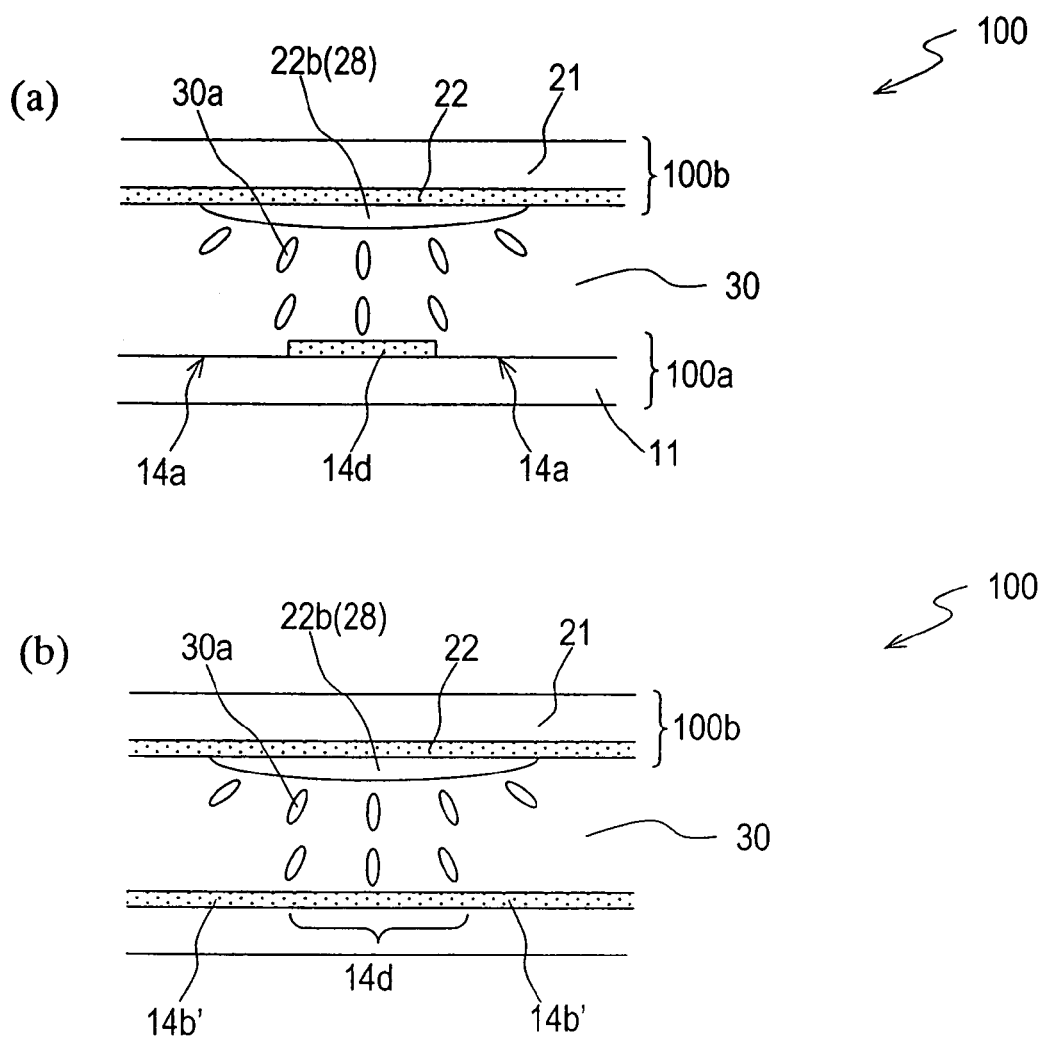

FIG. 8(a) and FIG. 8(b) show a cross-sectional structure of the liquid crystal display device 100 having any of the orientation-regulating structures described above. FIG. (a) and FIG. 8(b) show a state where a voltage is applied across the liquid crystal layer 30. FIG. 8(a) corresponds to a cross-sectional view taken along line 8A-8A' in FIG. 1, and FIG. 8(b) corresponds to a cross-sectional view taken along line 8B-8B'.

The counter substrate 100b of the liquid crystal display device 100 includes an orientation-regulating structure 28 (here, the protrusion 22b) in an area corresponding to the connecting portion 14d of the picture element electrode 14. Owing to this structure, the orientation-regulating force provided by the orientation-regulating structure 28 acts upon the liquid crystal molecules 30a in a region of the liquid crystal layer 30 above the connecting portion 14d, as shown in FIG. 8(a) and FIG. (b), both in the direction in which the connecting portion 14d is adjacent to the openings 14a and in the direction in which the connecting portion 14d is continuous with the unit solid portions 14b'. Therefore, the orientation in the region of the liquid crystal layer 30 which is above the connecting portion 14d is stabilized and the occurrence of the orientation disturbance is suppressed. As a result, a high quality display with the non-uniformity or roughness suppressed can be provided. Typically, owing to the orientation-regulating force of the orientation-regulating structure 28, a liquid crystal domain taking a radially-inclined orientation is formed even above the connecting portion 14d at least in the presence of an applied voltage.

Figure 9:
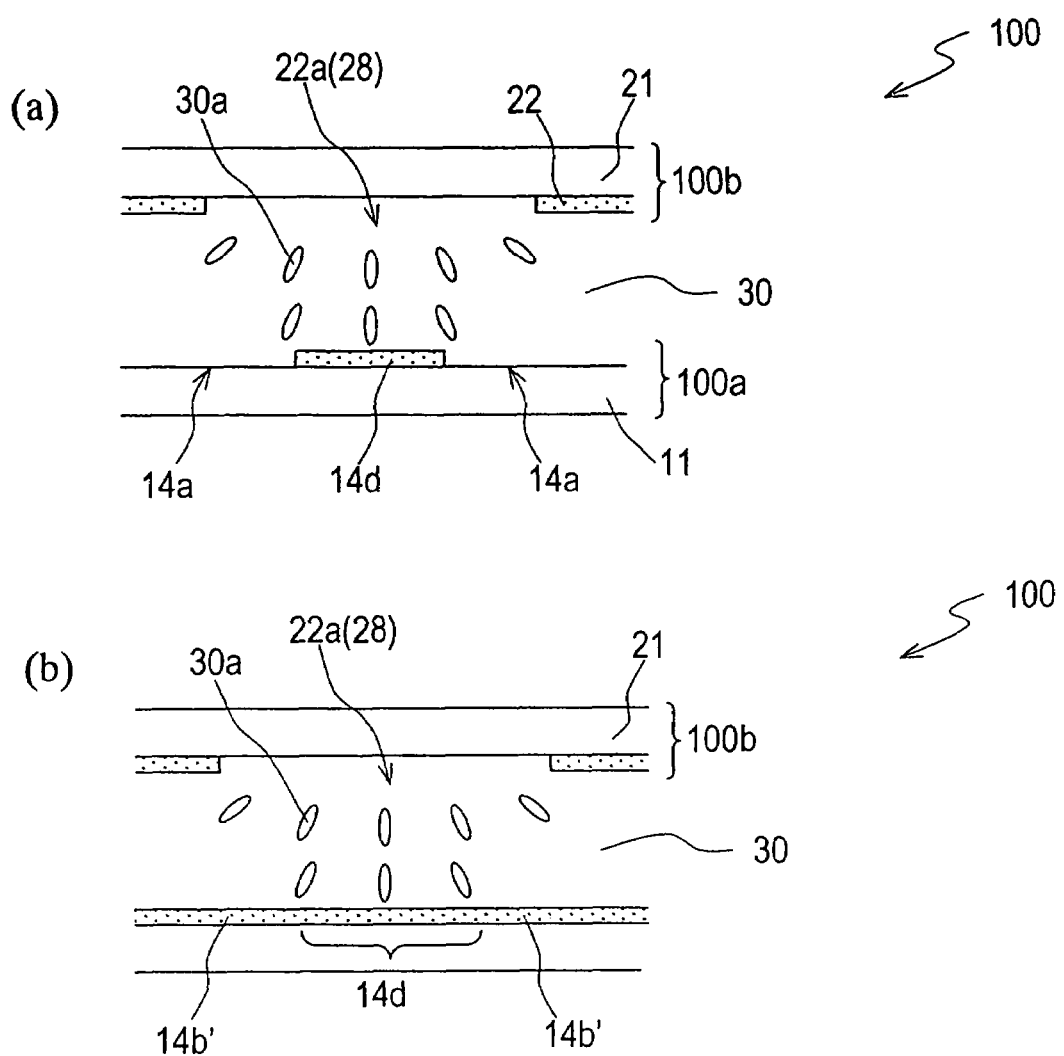
FIG. 9(a) and FIG. 9(b) are cross-sectional views schematically showing another embodiment of the liquid crystal display device 100 according to the present invention, wherein FIG. 9(a) corresponds to FIG. 8(a) and FIG. 9(b) corresponds to FIG. 8(b).
Figure 10:
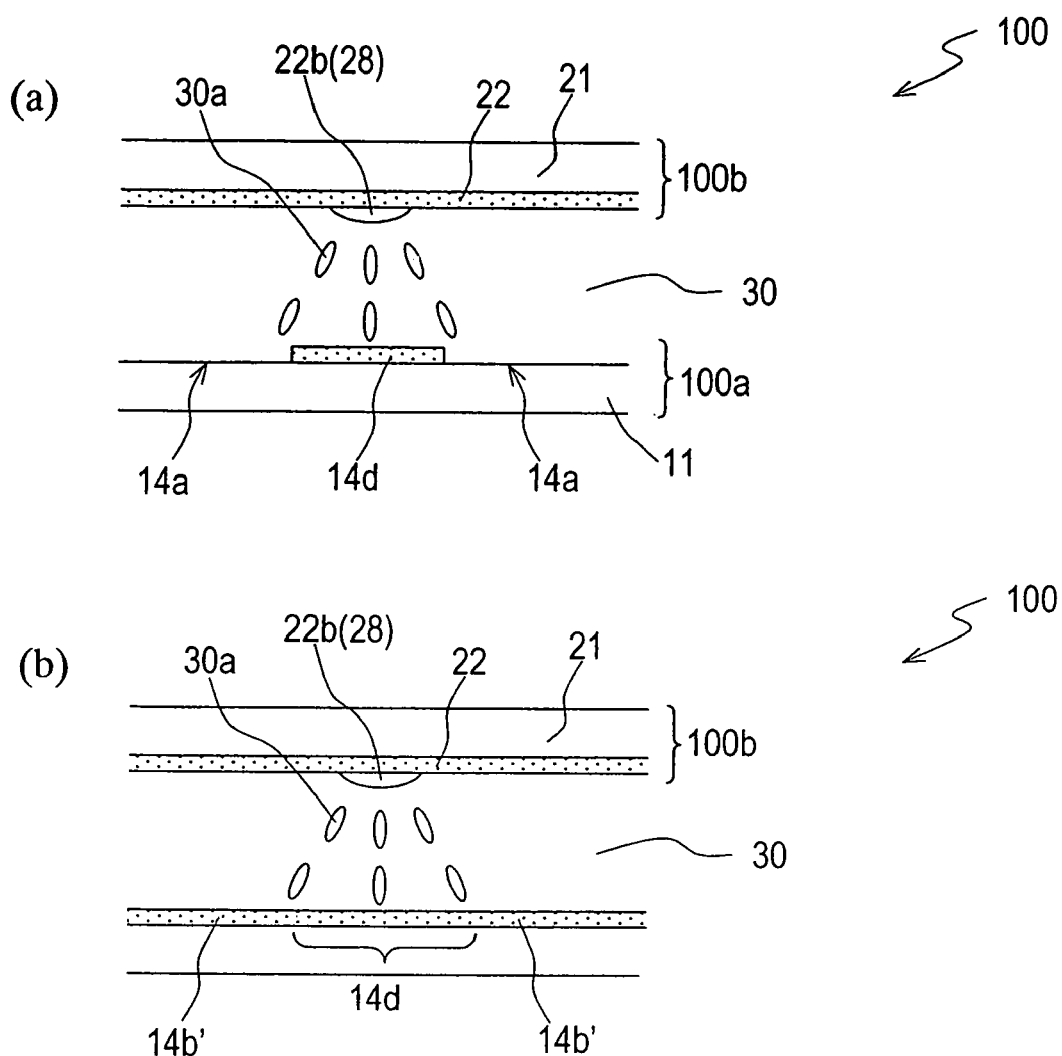
FIG. 10(a) and FIG. 10(b) are cross-sectional views schematically showing still another embodiment of the liquid crystal display device 100 according to the present invention, wherein FIG. 10(a) corresponds to FIG. 8(a) and FIG. 10(b) corresponds to FIG. 8(b).
Figure 11:
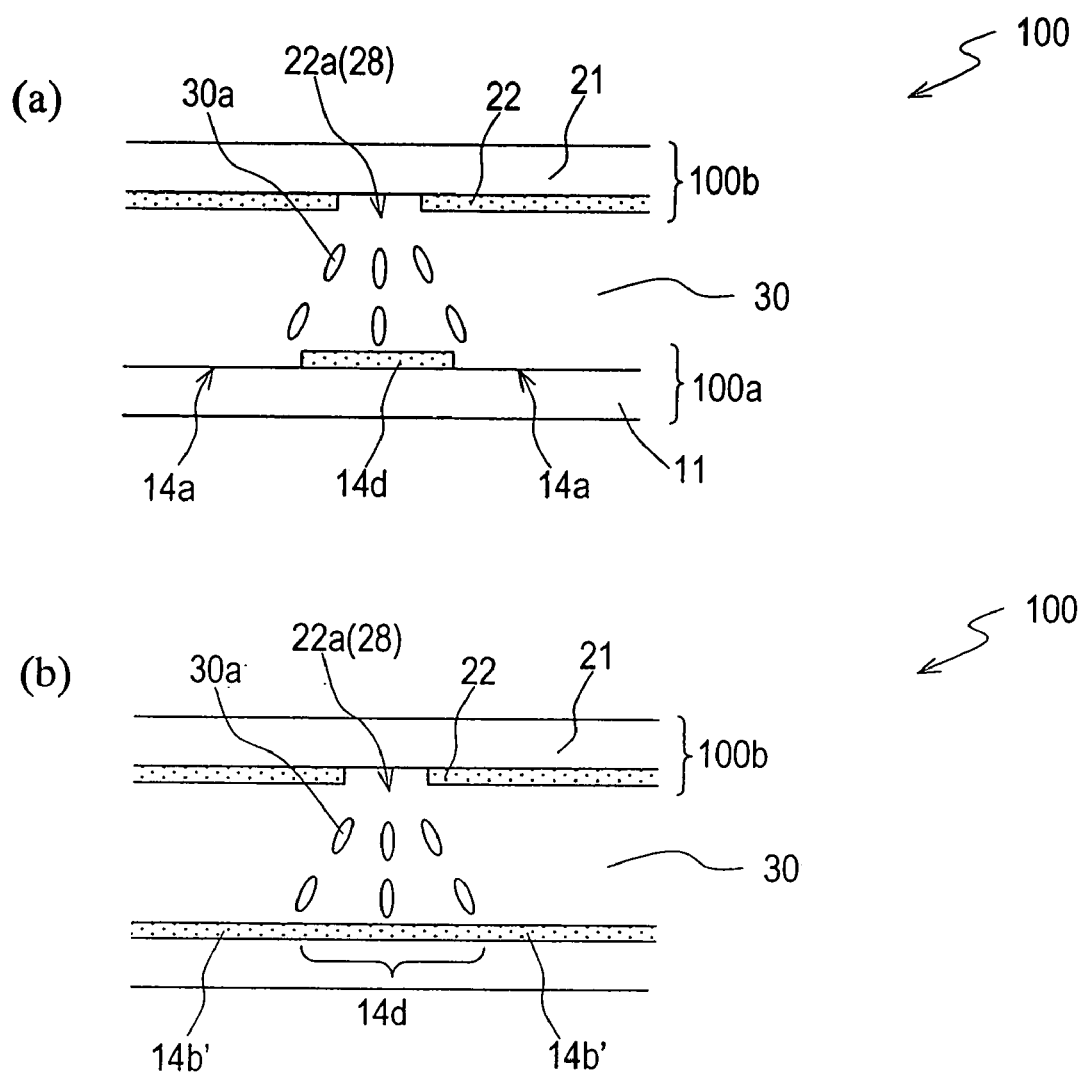
FIG. 11(a) and FIG. 11(b) are cross-sectional views schematically showing still another embodiment of the liquid crystal display device 100 according to the present invention, wherein FIG. 11(a) corresponds to FIG. 8(a) and FIG. 11(b) corresponds to FIG. 8(b).

In FIG. 8(a) and FIG. (b), the protrusion 22b protruding toward the liquid crystal layer 30 from the counter substrate 100b is shown as the orientation-regulating structure 28. The orientation-regulating structure 28 shown in each of FIG. 7(a), FIG. 7(c) and FIG. 7(d) also provides substantially the same effect. FIG. 9(a) and FIG. 9(b) show a cross-sectional view of the liquid crystal display device 100 including the orientation-regulating structure 28 having the opening 22a formed in the counter electrode 22. FIG. 9(a) and FIG. 9(b) respectively correspond to FIG. 8(a) and FIG. 8(b). As shown in FIG. 9(a) and FIG. 9(b), the orientation-regulating force provided by the orientation-regulating structure 28 acts upon the liquid crystal molecules 30a above the connecting portion 14d regardless of the direction (orientation), and a radially-inclined orientation is formed.

In FIG. 8(a), FIG. 8(b), FIG. 9(a) and FIG. 9(b), the protrusion 22b and the opening 22a of the counter substrate 100b are larger than the connecting portion 14d. Alternatively, as shown in FIG. 10(a), FIG. 10(b), FIG. 11(a) and FIG. 11(b), the protrusion 22b and the opening 22a of the counter substrate 100b may be smaller than (or of the same size as) the connecting portion 14d. In these cases also, substantially the same effect is provided. By adjusting the size of the orientation-regulating structure 28, the magnitude of the orientation-regulating force exerted on the liquid crystal molecules 30a above the connecting portion 14d can be controlled. Thus, the size of the orientation-regulating structure can be appropriately set based on the structure of the picture element electrode 14 to be used or the desired degree of orientation stability. For example, in the case where the protrusion 22b shown in FIG. 7(b) is adopted, the protrusion 22b can have a diameter of about 5 to about 20 µm and a height (thickness) of about 0.5 to about 2.0 µm. With such a size of the protrusion 22b, a sufficient orientation-regulating force can be obtained and the reduction in the contrast ratio caused by retardation can be suppressed to a practical level.

Figure 12:
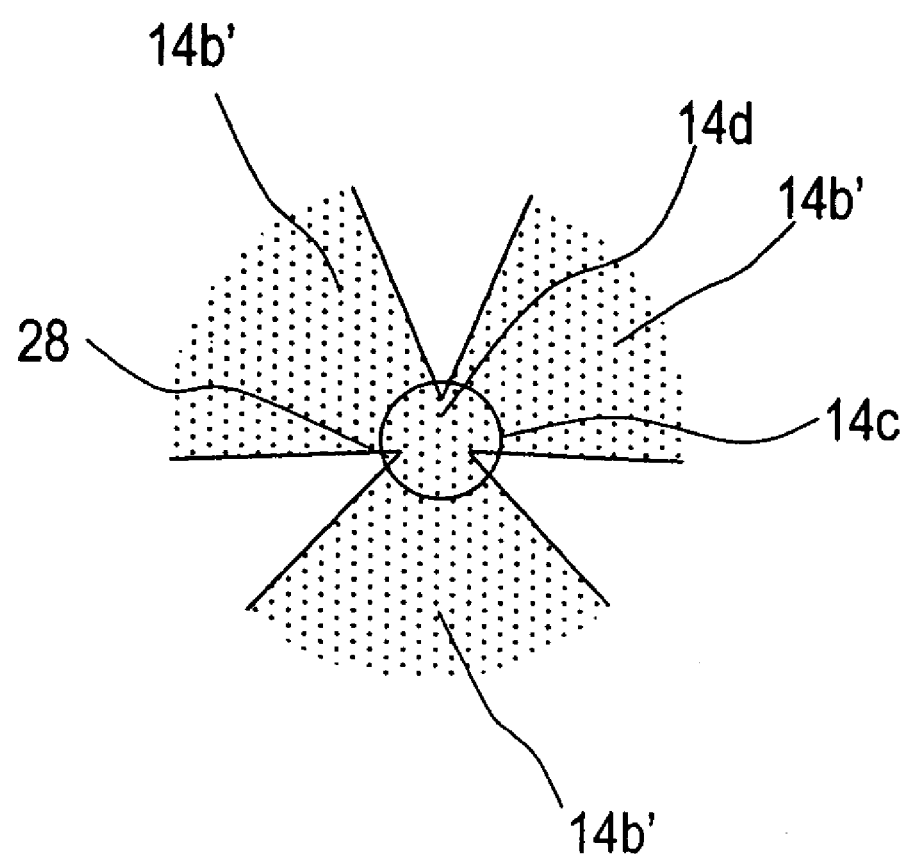
FIG. 12 is a plan view schematically showing another embodiment of the connecting portion of the picture element electrode.

The above-described effect of improving the display quality is provided where, as shown in FIG. 12, one connecting portion 14d connects three unit solid portions 14b' to one another, but is more conspicuously provided where, as shown in FIG. 1 or the like, one connecting portion 14d connects four (or more) unit solid portions 14b' to one another. The reason is that as a larger number of unit solid portions 14b' are connected by one connecting portion 14d, there are a larger number of directions (azimuths) in which the connecting portion 14d and the unit solid portion 14b' are continuous with each other, i.e., there are a larger number of directions (azimuths) in which the oblique electric field produced in each edge portion of the opening 14a does not act upon the liquid crystal molecules 30a above the connecting portion 14d.

In order to improve the resistance against a stress applied to the liquid crystal cell, another orientation-regulating structure may be provided in an area of the counter substrate corresponding to the unit solid portion.

FIG. 13(a) and FIG. 13(b) schematically show a liquid crystal display device 200 including orientation-regulating structures 29 provided in correspondence with the unit solid portions 14b'. FIG. 13(a) is a plan view showing a structure of one picture element region of the liquid crystal display device 200, and FIG. 13(b) is a cross-sectional view thereof taken along line 13B-13B' in FIG. 13(a).

As shown in FIG. 13(a) and FIG. 13(b), the counter substrate 200b of the liquid crystal display device 200 has the orientation-regulating structures 28 in areas corresponding to the connecting portions 14d of the picture element electrode 14. The counter substrate 200b further has the orientation-regulating structures 29 in areas corresponding to the unit solid portions 14b' of the picture element electrode 14.

As the orientation-regulating structures 29, the same type of structures as the orientation-regulating structures 28 provided in the areas corresponding to the connecting portions 14d are usable. Specifically, the same types of structures as those shown in FIG. 7(a) through FIG. 7(d) are usable. As an example, FIG. 13(b) shows the orientation-regulating structures 29 exerting an orientation-regulating force even in the absence of an applied voltage (FIG. 7(b) through FIG. 7(c)), but the structure shown in FIG. 7(a) is also usable.

More specifically, each orientation-regulating structure 29 is provided in an area corresponding to (opposing) the central portion of the unit solid portion 14b' or the vicinity thereof. In a state where a voltage is applied across the liquid crystal layer 30, i.e., in a state where a voltage is applied between the picture element electrode 14 and the counter electrode 22, the orientation-regulating direction provided by the oblique electric field produced in each edge portion EG of the opening 14 matches the orientation-regulating direction provided by the orientation-regulating force exerted by the orientation-regulating structure 29. As a result, the radially-inclined orientation is stabilized. This is schematically shown in FIG. 14(a) through FIG. 14(c). FIG. 14(a) shows a state in the absence of an applied voltage. FIG. 14(b) shows a state where the orientation has just started to change (initial ON state) after application of a voltage, and FIG. 14(c) schematically shows a steady state in the presence of an applied voltage.

As shown in FIG. 14(a), the orientation-regulating force exerted by the orientation-regulating structure 29 acts upon the liquid crystal molecules 30a in the vicinity thereof even in the absence of an applied voltage, and forms a radially-inclined orientation.

When a voltage starts to be applied, an electric field represented by equipotential lines EQ shown in FIG. 14(b) is produced (by the solid portion 14b), and a liquid crystal domain in which the liquid crystal molecules 30a take a radially-inclined orientation is formed in a region corresponding to each opening 14a and also a region corresponding to the solid portion 14b. Then, the liquid crystal molecules 30 reaches a steady state shown in FIG. 14(c). The inclination direction of the liquid crystal molecules 30a in each liquid crystal domain matches the inclination direction of the liquid crystal molecules 30a caused by the orientation-regulating force of the orientation-regulating structure 29.

As can be appreciated from the above, by providing the orientation-regulating structure 29 also in an area of the counter substrate 200b corresponding to the unit solid portion 14b', the radially-inclined orientation provided by the picture element electrode 14 can be further stabilized. Therefore, the display quality can be suppressed from being lowered due to a stress applied to a liquid crystal cell or the like.

When a stress is applied to the liquid crystal display device 200 in a steady state, the radially-inclined orientation in the liquid crystal layer 30 is once destroyed. Upon removal of the stress, however, the radially-inclined orientation is restored because the orientation-regulating force by the picture element electrode 14 and the orientation-regulating structure 29 (and also the orientation-regulating structure 28) acts upon the liquid crystal molecules 30a. In consequence, the generation of an after image due to a stress is suppressed. When the orientation-regulating force by the orientation-regulating structure 29 is too strong, retardation occurs due to the radially-inclined orientation even in the absence of an applied voltage. This may lower the display contrast ratio. However, the orientation-regulating force by the orientation-regulating structure 29 does not need to be very strong because such a force is only required to have an effect of stabilizing the radially-inclined orientation formed by the picture element electrode 14 and fixing the position of the central axis thereof. An orientation-regulating force which would not cause such a degree of retardation as to deteriorate the display quality is sufficient.

FIG. 15(a) and FIG. 15(b) show a manner in which liquid crystal domains are formed when a voltage is applied across the liquid crystal layer 30 of the liquid crystal display device 200. FIG. 15(a) shows a calculation result of the orientation of the liquid crystal molecules 30a (simulation result), and FIG. 15(b) is a photograph of a liquid crystal panel actually produced. FIG. 15(a) and FIG. 15(b) show a part of a picture element region. For example, FIG. 15(a) shows a region having a structure shown in FIG. 15(c). In FIG. 15(a), the openings 22a provided in the counter electrode 22 are adopted as the orientation-regulating structures 28 and 29. In FIG. 15(b), the protrusions 22b are adopted as the orientation-regulating structures 28 and 29.

As shown in FIG. 15(a) and FIG. 15(b), in the presence of an applied voltage, liquid crystal domains are formed in correspondence with the unit solid portions 14b', the openings 14a and the connecting portion 14d.

FIG. 16(a) and FIG. 16(b) show a manner in which liquid crystal domains are formed in the case where the orientation-regulating structures 28 are not provided above the connecting portions 14d. FIG. 16(a) and FIG. 16(b) respectively correspond to FIG. 15(a) and FIG. 15(b), and show a liquid crystal display device 1100 which has no orientation-regulating structure in any area corresponding to the connecting portion 14d as shown in FIG. 16(c).

As shown in FIG. 16(a) and FIG. 16(b), where no orientation-regulating structure is provided in any area corresponding to the connecting portion 14d, the liquid crystal domain is not formed above the connecting portion 14d. Even where the liquid crystal domain is not formed above the connecting portion 14d and thus the orientation of the liquid crystal molecules 30a above the connecting portion 14d is not regulated, ideally, the liquid crystal domains formed above the unit solid portion 14b' and the opening 14a are not influenced almost at all as represented by the calculation result shown in FIG. 16(a). However, in an actual liquid crystal panel, as shown in FIG. 16(b), the orientation in the liquid crystal layer 30 is disturbed in different manners in different regions corresponding to the connecting portions 14d. The liquid crystal domains formed in regions corresponding to the adjacent unit solid portions 14b' and openings 14a are influenced differently in different parts of each picture element region and even of the display plane. Therefore, the display quality is lowered due to the display non-uniformity and roughness.

By contrast, where the orientation-regulating structures 28 are provided above the connecting portions 14d, the orientation can be stabilized in the entire picture element region and also in the entire display plane of an actual liquid crystal panel as shown in FIG. 15(b). Thus, the high quality display can be provided.

Figure 17:
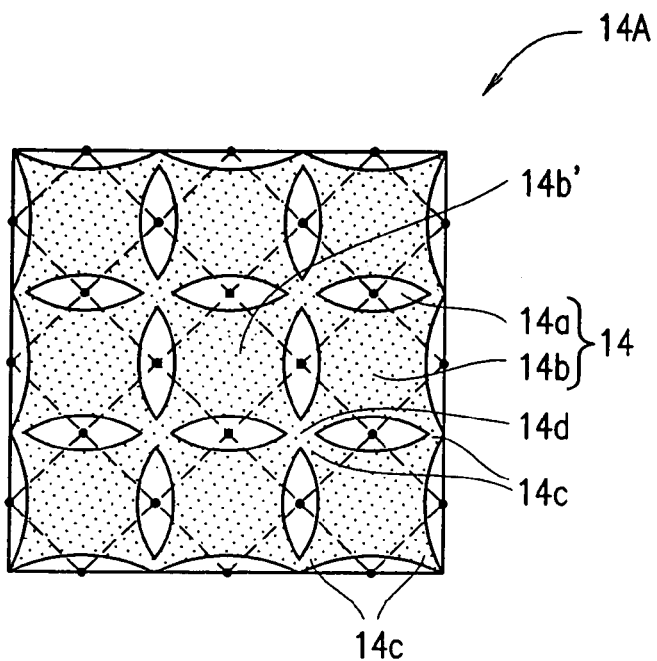
FIG. 17 is a plan view schematically showing another picture element electrode usable in a liquid crystal display device according to the present invention.

The shape of the picture element electrode 14 is not limited to those described above. FIG. 1 and FIG. 13 show a unit solid portion 14b' formed substantially only of straight lines. As in a picture element electrode 14A shown in FIG. 17, a unit solid portion 14b may have curves.

Figure 18:
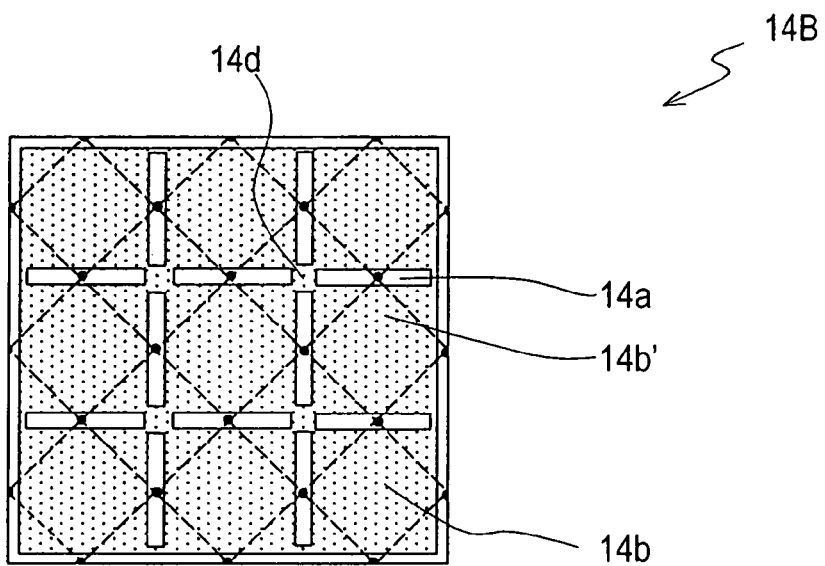
FIG. 18 is a plan view schematically showing still another picture element electrode usable in a liquid crystal display device according to the present invention.

In FIG. 1 and FIG. 13, the unit solid portion 14b' has four acute corners 14c, but the corners do not need to be acute. As in a picture element electrode 14B shown in FIG. 18, the unit solid portion 14b' may be generally rectangular. In order to improve the response characteristic, however, it is preferable that as shown in FIG. 1 and FIG. 13, the unit solid portion 14b' has acute corners 14c. In this specification, the phrase "acute corner" encompasses, as well as a corner formed of two straight lines making an angle of less than 90 degrees, a corner formed of a curve and a straight line making an angle of less than 90 degrees and a corner formed of two curves making an angle of less than 90 degrees (tangents at the intersection making an angle of less than 90 degrees).

Hereinafter, with reference to FIG. 19(a) and FIG. 19(b), the reasons why the response characteristic is improved when the corners 14c of a unit solid portion 14b' are acute will be described.

In the case where the corners 14c of the unit solid portion 14b' are acute as shown in FIG. 19(a), as compared to the case where the corners 1014c' are right-angled as shown in FIG. 19(b), a larger number of side edges of the picture element electrode 14 are formed for producing an oblique electric field, and thus the oblique electric field can act upon a larger number of liquid crystal molecules 30a. Therefore, a larger number of liquid crystal molecules 30a initially incline in response to the electric field, which shortens the time required for forming radially-inclined orientations in the entire picture element region. This is why the response speed is improved. Also in the case where the corners 14c are acute, the distance from a side edge of the picture element electrode 14 to the center of the unit solid portion 14b' is shorter. Therefore, the time required for the liquid crystal molecules 30a corresponding to the unit solid portion 14b' to fall by the influence of the liquid crystal molecules 30a inclined in an edge portion is shortened. This is also why a superb response characteristic is obtained.

FIG. 20(a) shows a liquid crystal display device including unit solid portions 14b' having acute corners. FIG. 20(b) and FIG. 20(c) are photographs showing a liquid crystal layer of this liquid crystal display device supplied with a voltage of 6 V. FIG. 20(b) shows a state immediately after the voltage application. FIG. 20(c) shows a state where the orientation of the liquid crystal molecules has reached a steady state (stable state). FIG. 21(a) shows a liquid crystal display device including unit solid portions 1014b' having no acute corners. FIG. 21(b) and FIG. 21(c) are photographs showing a liquid crystal layer of this liquid crystal display device supplied with a voltage of 6 V.

When a voltage is applied across the liquid crystal layer, as shown in FIG. 20(b) and FIG. 21(b), the liquid crystal molecules in the vicinity of the side edges of the unit solid portions 14b' and 1014b', and the liquid crystal molecules 30a above the center and the vicinity thereof of the unit solid portions 14b' and 1014b' corresponding to the orientation-regulating structures 29, initially start inclining. Then, by the influence of these liquid crystal molecules 30a, the liquid crystal molecules 30a in the other regions incline and are oriented as shown in FIG. 20(c) and FIG. 21(c).

In the case where the corners are not acute, as shown in FIG. 21(b), a fewer number of liquid crystal molecules incline immediately after the voltage application (there are a larger number of dark regions). By contrast, where the corners are acute, as shown in FIG. 20(b), a larger number of liquid crystal molecules incline immediately after the voltage application (there are a larger number of bright regions), which indicates that the response characteristic is improved.

Figure 22:
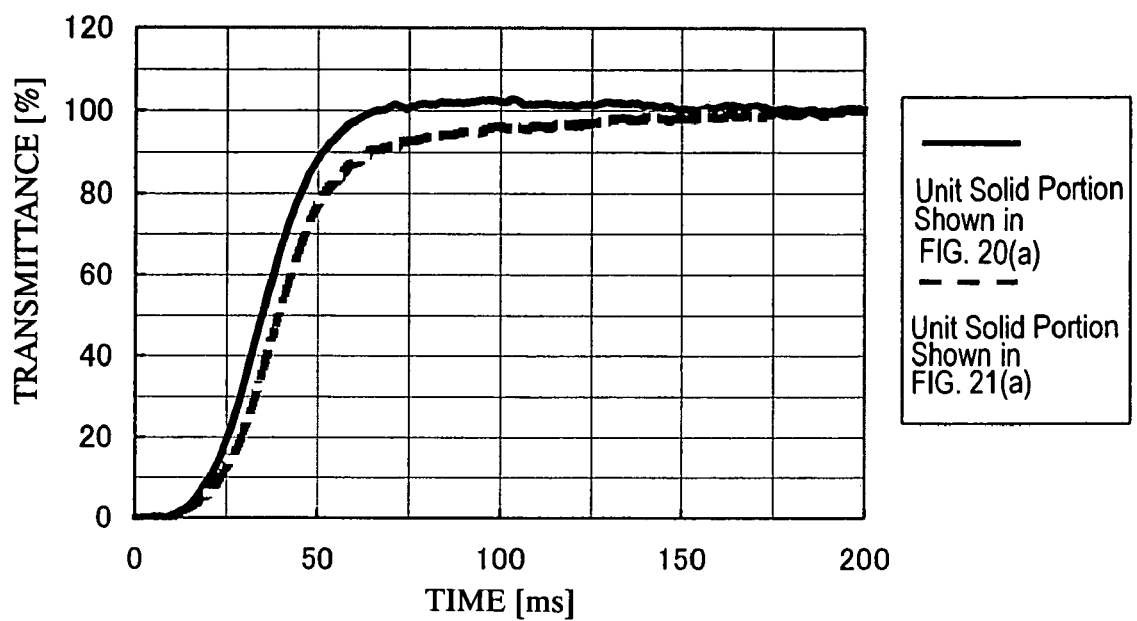
FIG. 22 is a graph illustrating response waveforms obtained in a liquid crystal display device including unit solid portions shown in FIG. 20(a) and a liquid crystal display device including unit solid portions shown in FIG. 21(a), when the voltage applied across the liquid crystal layer is changed from 1.2V to 2.85V.

FIG. 22 shows response waveforms obtained in a liquid crystal display device including unit solid portions 14b' shown in FIG. 20(a) and a liquid crystal display device including unit solid portions 1014b' shown in FIG. 21(a), when the voltage applied to the liquid crystal layer is changed from 1.2 V to 2.85 V. In FIG. 22, the transmittance in the steady state when a voltage of 2.85 V is applied is 100%.

As can be appreciated from FIG. 22, when the corners are acute as compared to when the corners are not acute, the orientation of the liquid crystal molecules reaches the steady state in a shorter time; namely, the response characteristic is improved.

In a liquid crystal display device according to the present invention, each picture element electrode has openings. This may cause a problem that the light utilization factor is lowered because a sufficient retardation change is not obtained due to a sufficient level of voltage not being applied across regions of liquid crystal layer corresponding to the openings. This can be solved by the following arrangement. A dielectric layer is provided on one surface of the electrode having the openings (upper electrode), the one surface being farther from the liquid crystal layer, and another electrode (lower electrode) is provided so as to oppose at least a part of each opening of the upper electrode with the dielectric layer interposed therebetween (i.e., a two-layer electrode is provided). With such a structure, a sufficient level of voltage can be applied across the regions of the liquid crystal layer corresponding to the openings. As a result, the light utilization factor and the response characteristic can be improved.

FIG. 23(a) through FIG. 23(c) schematically show a cross-sectional structure of one picture element region of a liquid crystal display device 300. The liquid crystal display device 300 includes a picture element electrode (two-layer electrode) 16 including a lower electrode 12, an upper electrode 14 and a dielectric layer 13 provided therebetween. The upper electrode 14 of the picture element electrode 16 is substantially equivalent to the above-described picture element electrode 14, and has openings and solid portions of any of various shapes and arrangements described above. Hereinafter, the functions of the picture element electrode 16 having the two-layer structure will be described.

The picture element electrode 16 of the liquid crystal display device 300 has a plurality of openings 14a (including 14a1 and 14a2). FIG. 23(a) schematically shows an orientation of the liquid crystal molecules 30a in the liquid crystal layer 30 in the absence of an applied voltage (OFF state). FIG.

Figure 23:
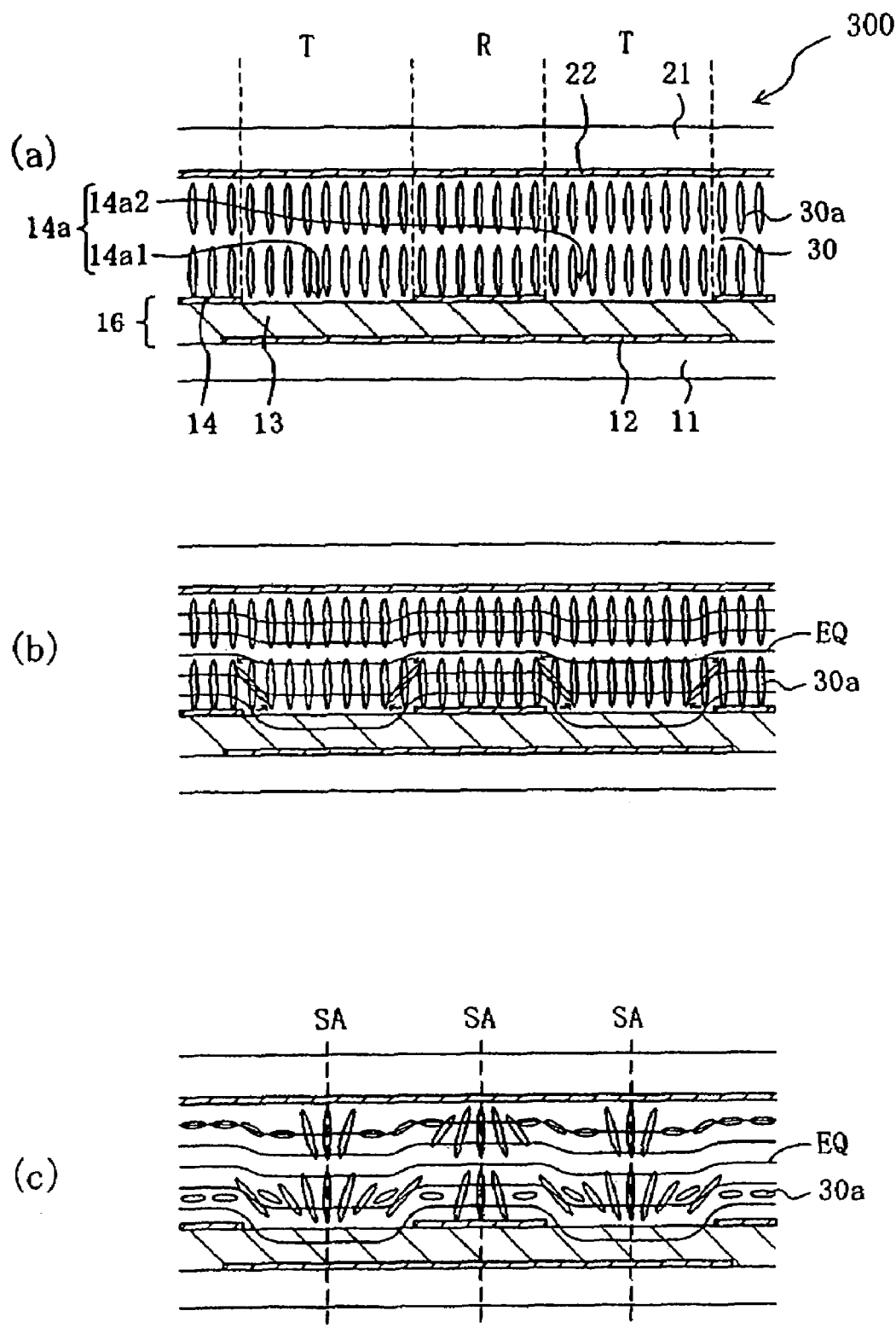

23(b) schematically shows a state where the orientation has just started to change (initial ON state) in accordance with the voltage applied across the liquid crystal layer 30. FIG. 23(c) schematically shows a state where the orientation of the liquid crystal molecules 30a, which has been changing in accordance with the applied voltage, has reached a steady state. In the example shown in FIG. 23, the lower electrode 12, provided so as to oppose the openings 14a1 and 14a2 with the dielectric layer 13 interposed therebetween, overlaps the openings 14a1 and 14a2 and also exists in positional correspondence with an area between the openings 14a1 and 14a2 (where the upper electrode 14 exists). The lower electrode 12 is not limited to being arranged in this manner. The relationship between the area size of the opening 14a1 or 14a2 and the area size of the lower electrode 12 may be that the area size of the lower electrode 12=the area size of the opening 14a, or the area size of the lower electrode 12<the area size of the opening 14a. Namely, the lower electrode 12 only needs to be provided so as to oppose at least a part of the opening 14a with the dielectric layer 13 interposed therebetween. In a structure where the lower electrode 12 is provided in the opening 14, there may be an area including neither the lower electrode 12 nor the upper electrode 14 (a gap area) in a plane viewed in a direction normal to the substrate 11. In this case, a sufficiently high voltage may not be applied across a region of the liquid crystal layer 30 corresponding to the gap area. In order to stabilize the orientation in the liquid crystal layer 30, the width of the gap area is preferably sufficiently small, typically equal to or less than about 4 µm. A part of the lower electrode 12 provided in positional correspondence with the conductive film of the upper electrode 14 with the dielectric layer 13 interposed therebetween does not substantially influence the electric field to be applied across the liquid crystal layer 30. Therefore, the lower electrode 12 does not need to be specifically patterned, but causes no problem if patterned.

As shown in FIG. 23(a), when the picture element electrode 16 and the counter electrode 22 are at the same potential (a state where no voltage is applied across the liquid crystal layer 30), the liquid crystal molecules 30a in the picture element region are oriented vertical to the surfaces of the substrates 11 and 21. Herein, the upper electrode 14 and the lower electrode 12 of the picture element electrode 16 have an equal potential for the sake of simplicity.

When a voltage is applied across the liquid crystal layer 30, a potential gradient represented by the equipotential lines EQ shown in FIG. 23(b) is produced. In a region of the liquid crystal layer 30 which is between the upper electrode 14 of the picture element electrode 14 and the counter electrode 22, a uniform potential gradient represented by the equipotential lines EQ parallel to the surfaces of the upper electrode 14 and the counter electrode 22 is produced. In regions of the liquid crystal layer 30 which are above the openings 14a1 and 14a2 of the upper electrode 14, a potential gradient corresponding to the potential difference between the lower electrode 12 and the counter electrode 22 is produced. Since the potential gradient produced in the liquid crystal layer 30 at this point is influenced by the voltage drop caused by the dielectric layer 13, the equipotential lines EQ in the liquid crystal layer 30 drop at the openings 14a1 and 14a2 (i.e., a plurality of "troughs" are formed in the equipotential lines EQ). The lower electrode 12 is provided in positional correspondence with the openings 14a1 and 14a2 with the dielectric layer 13 interposed therebetween. Therefore, in regions of the liquid crystal layer 30 corresponding to the centers of the openings 14a1 and 14a2 and the vicinity thereof, a potential gradient represented by the equipotential lines EQ parallel to the surfaces of the upper electrode 14 and the counter electrode 22 is produced ("bottom of the troughs" of the equipotential lines EQ). In a region of the liquid crystal layer 30 above an edge portion EG of the opening 14a1 or 14a2 (a peripheral portion within the opening including an external boundary of the opening), an oblique electric field represented by an inclined part of the equipotential lines EQ is produced.

As is clear from a comparison between FIG. 23(a) and FIG. 2(a), the liquid crystal display device 300 has the lower electrode 12. Owing to this structure, a sufficient level of voltage can act even upon the liquid crystal molecules 30a in a liquid crystal domain in a region corresponding to each opening 14a.

Upon the liquid crystal molecules 30a having a negative dielectric anisotropy, a torque acts to direct the axial direction of such liquid crystal molecules 30a to be parallel to the equipotential lines EQ. Accordingly, as represented by the arrows in FIG. 23(b), the liquid crystal molecules 30a above the right edge portion EG of each opening 14a incline (rotate) clockwise, and the liquid crystal molecules 30a above the left edge portion EG of each opening 14a incline 101. (rotate) counterclockwise. As a result, the liquid crystal molecules 30a above the edge portions EG are oriented parallel to the corresponding portions of the equipotential lines EQ.

In FIG. 23(b), an electric field (oblique electric field) represented by a part of the equipotential lines EQ inclined with respect to the axial orientation of the liquid crystal molecules 30a is produced in the edge portions EG of the openings 14a1 and 14a2 in the liquid crystal display device 300. When this occurs, as shown in FIG. 3(b), the liquid crystal molecules 30a are inclined in whichever direction that requires less inclination for the liquid crystal molecules 30a to be parallel to the equipotential line EQ (in the counterclockwise direction in the example of the figure). As shown in FIG. 3(c), a liquid crystal molecule 30a, located in a region where the electric field represented by a part of the equipotential line EQ vertical to the axial orientation of the liquid crystal molecule 30a is produced, is inclined in the same direction as that of the liquid crystal molecules 30a on the inclined part of the equipotential line EQ, such that the orientation of the former liquid crystal molecule 30a is continuous (in conformity) with the orientation of the latter liquid crystal molecules 30a.

As described above, the liquid crystal molecules 30a change the orientation thereof, starting from those located on the inclined part of the equipotential lines EQ, and reach a steady state. When this occurs, as schematically shown in FIG. 23(c), an inclined orientation (radially-inclined orientation) symmetric about the center SA of each of the openings 14a1 and 14a2 is formed. The liquid crystal molecules 30a above an area of the upper electrode 14 between the adjacent openings 14a1 and 14a2 are also inclined so as to be oriented continuously (in conformity) with the liquid crystal molecules 30a above the edge portions of the openings 14a1 and 14a2. The liquid crystal molecules 30a located above a region equally distanced from an edge portion EG of the opening 14a1 and the adjacent edge portion EG of the opening 14a2 are influenced substantially equally by the respective orientations of the liquid crystal molecules 30a above such edge portions EG. Therefore, such liquid crystal molecules 30a remain in a vertical orientation state, like the liquid crystal molecules 30a located above the center of each of the openings 14a1 and 14a2. As a result, a region of the liquid crystal layer above the upper electrode 14 between the adjacent openings 14a1 and 14a2 obtains a radially-inclined orientation. The inclination direction is different between a region of liquid crystal layer corresponding to each of the openings 14a1 and 14a2 and a region of the liquid crystal layer corresponding to an area between the openings 14a1 and 14a2.

This will be described regarding the liquid crystal molecules 30a at the center of each radially-inclined orientation in FIG. 23(c). The liquid crystal molecules 30a above the openings 14a1 and 14a2 are oriented in the shape of a cone that spreads toward the counter electrode, whereas the liquid crystal molecules 30a above the inter-opening areas are oriented in the shape of a cone that spreads toward the upper electrode 14. These radially-inclined orientations are both formed so as to be in conformity with the inclination direction of the liquid crystal molecules 30a above the edge portions, and thus are mutually continuous.

As described above, when a voltage is applied across the liquid crystal layer 30, the liquid crystal molecules 30a incline, starting from those above the edge portions EG of the plurality of openings 14a1 and 14a2 in the upper electrode 14. Then, the surrounding liquid crystal molecules 30a also incline to be in conformity with the liquid crystal molecules 30a above the edge portions EG. Thus, a radially-inclined orientation is formed. As the number of the openings 14a in one picture element region is larger, the number of the liquid crystal molecules 30a initially starting to incline in response to the electric field is larger, and thus the time required for forming a radially-inclined orientation in the entire picture element region is shorter. Namely, the response speed of the liquid crystal display device can be improved by increasing the number of the openings 14a in the picture element electrode 16 in each picture element region. Where the picture element electrode 16 has a two-layer structure including an upper electrode 14 and a lower electrode 12, even the liquid crystal molecules in positional correspondence with the openings 14a can be acted upon by a sufficient level of electric field and thus the response characteristic of the liquid crystal display device is improved.

The dielectric layer 13 provided between the upper electrode 14 and the lower electrode 12 of the picture element electrode 16 may have a hole (opening) or a recess in the opening 14a of the upper electrode 14. Namely, the picture element electrode 15 having a two-layer structure may have a structure in which a part of the dielectric layer 13 which corresponds to the opening 14a of the upper electrode 14 is entirely removed (a hole is formed) or partially removed (a recess is formed).

First, with reference to FIG. 24, a structure and operation of a liquid crystal display device 400 including a picture element electrode 16 having a hole in the dielectric layer 13 will be described. The following description will be given regarding one opening 14a of the upper electrode 14 for the same of simplicity.

In the liquid crystal display device 400, the upper electrode 14 of the picture element electrode 16 has the opening 14a, and the dielectric layer 13 provided between the lower electrode 12 and the upper electrode 14 has an opening 13a formed in correspondence with the opening 14a of the upper electrode 14. The lower electrode 12 is exposed in the opening 13a. A side wall of the opening 13a of the dielectric layer 13 is generally tapered. The liquid crystal display device 400 has substantially the same structure as that of the liquid crystal display device 300 except that the dielectric layer 13 has the opening 13a. The picture element electrode 16 of the two-layer structure acts in substantially the same manner as the picture element electrode 16 of the liquid crystal display device 300 and forms a liquid crystal domain taking a radially-inclined orientation in the liquid crystal layer 30 upon application of a voltage.

With reference to FIG. 24(a) through 24(c), the operation of the liquid crystal display device 400 will be described. FIG. 24(a) through 24(c) respectively correspond to FIG. 23(a) through 23(c) showing the liquid crystal display device 300.

As shown in FIG. 24(a), in the absence of an applied voltage (OFF state), the liquid crystal molecules 30a in the picture element region are vertically oriented to the surfaces of the substrates 11 and 21. Herein, the orientation-regulating force provided by the side wall of the opening 13a will be ignored for the sake of simplicity.

When a voltage is applied across the liquid crystal layer 30, a potential gradient represented by equipotential lines EQ shown in FIG. 24(b) is produced. As can be appreciated from the equipotential lines EQ dropping in a region corresponding to the opening 14a of the upper electrode 14 (formation of a "trough"), an inclined electric field is formed in the liquid crystal layer 30 of the liquid crystal display device 400, like the potential gradient shown in FIG. 24(b). However, since the dielectric layer 13 of the picture element electrode 16 has the opening 13a in an area corresponding to the opening 14a of the upper electrode 14, the voltage applied across a region of the liquid crystal layer 30 corresponding to the opening 14a (corresponding to the opening 13a) is exactly the potential difference between the lower electrode 12 and the counter electrode 22. Therefore, no voltage drop (capacitance division) is generated by the dielectric layer 13. Namely, there are seven equipotential lines EQ between the upper electrode 14 and the counter electrode 22 throughout the liquid crystal layer 30 (by contrast, in FIG. 23(c), one of five equipotential lines EQ goes into the dielectric layer 13). Thus, a constant voltage is applied throughout the picture element region.

As described above, by forming the opening 13a in the dielectric layer 13, a region of the liquid crystal layer 30 corresponding of the opening 13a can be supplied with the same level of voltage as that of the other regions of the liquid crystal layer 30. However, the thickness of the liquid crystal layer 30 supplied with the voltage is different in different parts of the picture element region, and thus the retardation change at the time of voltage application is different in different parts. There is a problem that when the degree of change is significantly large, the display quality is lowered.

Figure 24:
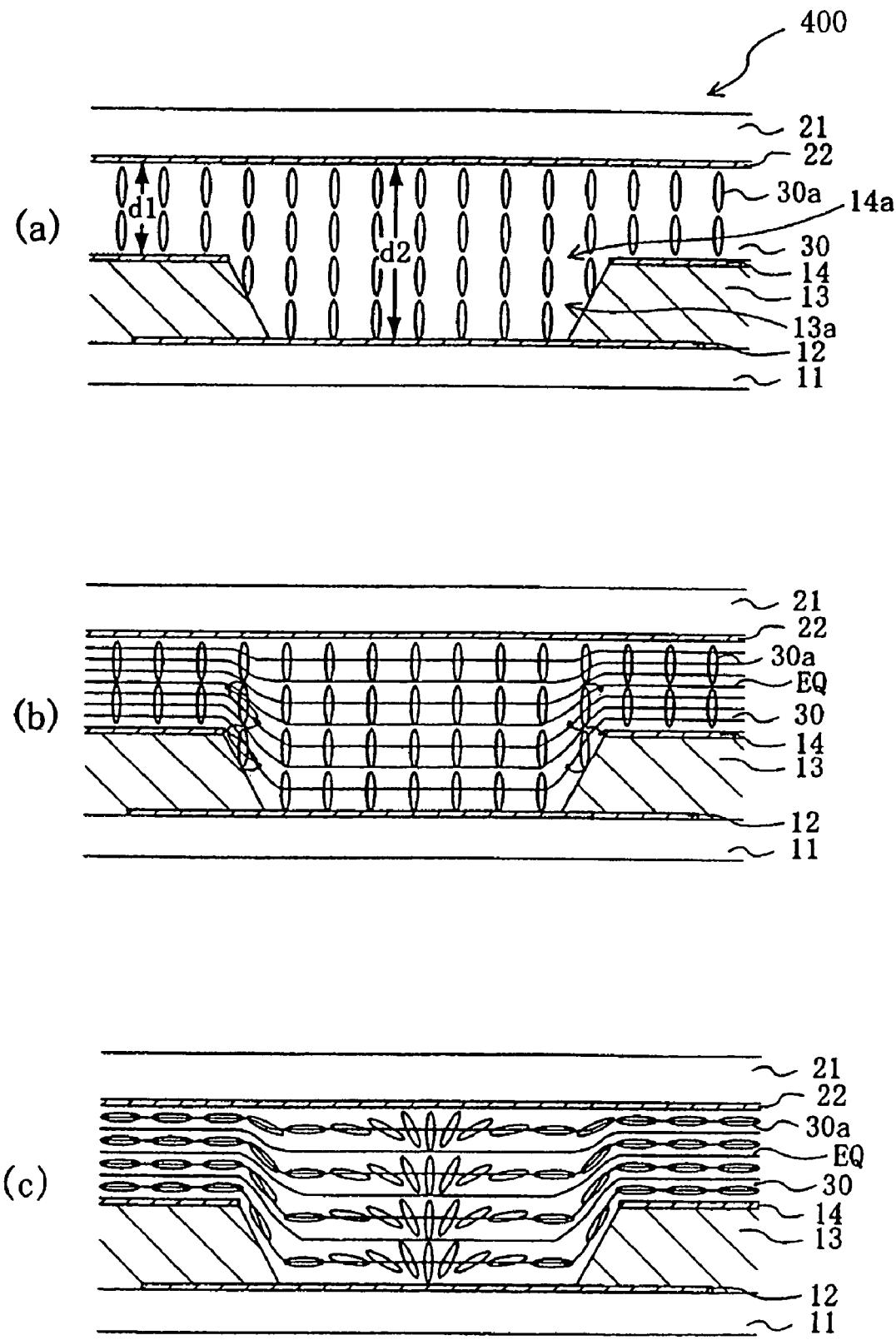

In the structure shown in FIG. 24, thickness d1 of a region of the liquid crystal layer 30 above the upper electrode 14 (solid portion other than the opening 14a), and thickness d2 of a region of the liquid crystal layer 30 above a part of the lower electrode 12 corresponding to the opening 14a (and the hole 13a), are different from each other by the thickness of the dielectric layer 13. When the same level of voltage is applied across the region of the liquid crystal layer 30 having thickness d1 and the region of the liquid crystal layer 30 having thickness d2, the amounts of retardation change accompanying the orientation change in these regions of liquid crystal layer 30 are different from each other by the influence of the thickness of each region. When the relationship between the applied voltage and the retardation amount in the liquid crystal layer 30 is significantly changed region by region, the following problem occurs. A design giving priority to the display quality sacrifices the transmittance, whereas a design giving priority to the transmittance sacrifices the display quality due to a shift in the color temperature in the case of white display. For these reasons, when the liquid crystal display device 400 is used as a transmission type liquid crystal display device, the dielectric layer 13 is preferably thin.

Figure 25:
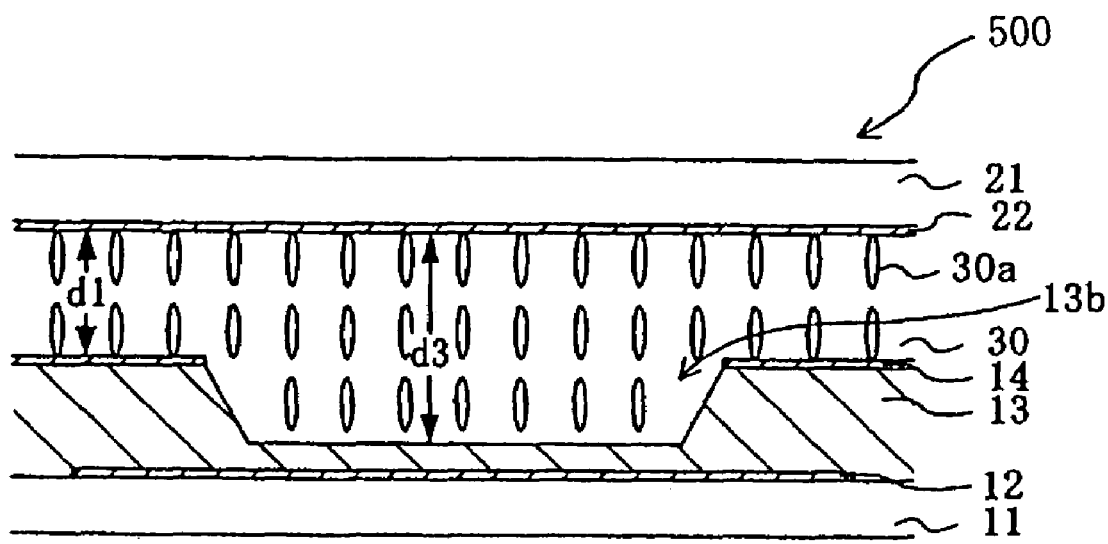
FIG. 25 schematically shows a cross-sectional structure of one picture element region of still another liquid crystal display device 500 having a two-layer electrode.

Next, FIG. 25 shows a cross-sectional structure of one picture element region of a liquid crystal display device 500 in which the dielectric layer of the picture element electrode has a recess.

The dielectric layer 13 included in the picture element electrode 16 of the liquid crystal display device 500 has a recess 13b in correspondence with the opening 14a of the upper electrode 14. Except for this point, the liquid crystal display device 500 has substantially the same structure as that of the liquid crystal display device 400 shown in FIG. 24.

In the liquid crystal display device 500, a part of the dielectric layer 13 which positionally corresponds to the opening 14a of the upper electrode 14 of the picture element electrode 16 is not completely removed. Therefore, thickness d3 of a region of the liquid crystal layer 30 corresponding to the opening 14a is smaller than thickness d2 of the region of the liquid crystal layer 30 corresponding to the opening 14a of the liquid crystal display device 500 by the thickness of a part of the dielectric layer 13 in the recess 13b. The voltage applied across the region of the liquid crystal layer 30 corresponding to the opening 14a is subjected to the voltage drop (capacitance division) caused by the part of the dielectric layer 13 in the recess 13b, and therefore is lower than the voltage applied across the region of the liquid crystal layer 30 above the upper electrode 14 (area excluding the opening 14a). Accordingly, by adjusting the thickness of the part of the dielectric layer 13 in the recess 13b, (i) the difference in the retardation amount caused by the difference in the thickness of the liquid crystal layer 30 and (ii) the local difference in the level of voltage applied across the liquid crystal layer 30 (the amount of reduction in the voltage applied across the region of the liquid crystal layer 30 above the opening 14a) can be controlled. In this way, the relationship between the applied voltage and the retardation is prevented from being different in different parts of the picture element region. More precisely, by adjusting the birefringence and the thickness of the liquid crystal layer, the dielectric constant and the thickness of the dielectric layer, and the thickness of the part of the dielectric layer in the recess (depth of the recess), the relationship between the applied voltage and the retardation can be made constant throughout the picture element region. This realizes a high quality display. Especially as compared to a transmission type liquid crystal display device including a dielectric layer having a flat surface, the above-mentioned arrangement has an advantage that the reduction in the transmittance (reduction in the light utilization factor) caused by the reduction in the voltage applied across a region of the liquid crystal layer corresponding to the opening 14a of the upper electrode 14 is suppressed.

The above description is given regarding the case where the upper electrode 14 and the lower electrode 12 included in the picture element electrode 16 are supplied with the same level of voltage. A structure where the lower electrode 12 and the upper electrode 14 are supplied with different levels of voltage can provide a wider variety of liquid crystal display devices realizing a display without non-uniformity. For example, in a structure where the dielectric layer 13 is provided in the opening 14a of the upper electrode 14, a higher level of voltage can be applied to the lower electrode 12 than the voltage applied to the upper electrode 14. In this manner, the variance of the voltage level applied across the liquid crystal layer 30 in the picture element region can be suppressed. In the case where, as a result of application of a voltage lower by the voltage drop caused by the dielectric layer 13, the same strength of electric field is produced in the region of the liquid crystal layer 30 above the upper electrode 14 and the region of the liquid crystal layer 30 above the dielectric layer 13 on the lower electrode 12, no oblique electric field is produced in the edge portions of the upper electrode 14. When this occurs, the orientation cannot be controlled. Namely, the electric fields should have the relationship of: the strength of the electric field acting upon the region of the liquid crystal layer above the upper electrode 14>the strength of the electric field acting upon the region of the liquid crystal layer above the dielectric layer 13 on the lower electrode 12.

A liquid crystal display device including the picture element electrode 16 of the two-layer structure is used as a transmission-reflection combination type liquid crystal display device as well as a transmission type or reflection type liquid crystal display device (see, for example, Japanese Laid-Open Patent Publication No. 11-101992).

A transmission-reflection combination type liquid crystal display device (hereinafter, referred to as a "combination type liquid crystal display device") refers to a liquid crystal display device having a transmission area T for providing a display in a transmission mode and a reflection area R providing a display in a reflection mode in one picture element region (see FIG. 23(a)). The transmission area T and the reflection area R are typically defined by a transmission electrode and a reflection electrode, respectively. The reflection area may be defined by a combination of a reflection layer and a transmission electrode, instead of by a reflection electrode.

The combination type liquid crystal display device can provide a display only in the reflection mode or only in the transmission mode in a switchable manner, or can provide a display in both modes simultaneously. Accordingly, the display can be provided in the reflection mode in an environment with bright ambient light, and in the transmission mode in a dark environment. When the display is provided in both modes simultaneously, a reduction in the contrast ratio, which occurs when the transmission type liquid crystal display device is used in an environment with bright ambient light (in a state where fluorescent light or sunlight is directly incident on a display surface at a specific angle), can be suppressed. A transmission-reflection combination type liquid crystal display device can thus compensate for the defect of a transmission type liquid crystal display device. The area size ratio between the transmission area T and the reflection area R can be appropriately set in accordance with the use of the liquid crystal display device. For a liquid crystal display device used only as a transmission type device, the area size ratio of the reflection area can be reduced to the extent that the reflection mode display cannot be provided. Still, the above-described defect of a transmission type liquid crystal display device can be compensated for.

As shown in FIG. 23(a), the liquid crystal display device 300 can be used as a combination type device by, for example, providing a reflection electrode as the upper electrode 14 and a transparent electrode as the lower electrode 12. A combination type liquid crystal display device is not limited to this, and can be provided by using a transparent conductive layer as either the upper electrode 14 or the lower electrode 12 and using a reflective conductive layer as the other electrode in any of the above-described liquid crystal display devices. In order to match the voltage—transmittance characteristic between the reflection mode display and the transmission mode display, it is preferable to adjust the thickness of the liquid crystal layer 30 in the reflection area R(for example, d1 in FIG. 24(a)) to be about half of the thickness of the liquid crystal layer 30 in the transmission area T (for example, d2 in FIG. 24(a)). Needless to say, the voltage to be applied to the upper electrode 14 and the voltage to be applied to the lower electrode 12 may be adjusted, instead of adjusting the thicknesses of the liquid crystal layer.

INDUSTRIAL APPLICABILITY

According to the present invention, a liquid crystal display device having a wide viewing angle characteristic and providing a superb display quality can be provided.

According to the present invention, liquid crystal domains taking a radially-inclined orientation are formed stably and highly continuously. Therefore, the display quality of a conventional liquid crystal display device having a wide viewing angle characteristic can be further improved.

Since the orientation-regulating structure stabilizes the orientation of a region of the liquid crystal layer above the connecting portion of the electrode, a still higher quality display is realized.

The invention claimed is:

1. A liquid crystal display device, comprising:
a first substrate, a second substrate, and a liquid crystal layer provided between the first substrate and the second substrate;
wherein:
a plurality of picture element regions are each defined by a first electrode provided on one surface of the first substrate which is closer to the liquid crystal layer and a second electrode provided on the second substrate and opposing the first electrode with the liquid crystal layer interposed therebetween;
in each of the plurality of picture element regions, the first electrode includes a plurality of openings and a solid portion; and the liquid crystal layer is in a vertical orientation state when no voltage is applied between the first electrode and the second electrode, and when a voltage is applied between the first electrode and the second electrode, forms a plurality of liquid crystal domains each taking a radially-inclined orientation in correspondence with the plurality of openings and the solid portion by an oblique electric field produced in edge portions of the plurality of openings of the first electrode;
the solid portion of the first electrode includes a plurality of unit solid portions and a plurality of connecting portions each for connecting at least three unit solid portions of the plurality of unit solid portions to one another; and
the second substrate has a first orientation-regulating structure in an area corresponding to each of the plurality of connecting portions, the first orientation-regulating structure exerting an orientation-regulating force for placing liquid crystal molecules in the liquid crystal layer above each of the plurality of connecting portions into a radially-inclined orientation at least in a state where a voltage is applied between the first electrode and the second electrode.

2. The liquid crystal display device of claim 1, wherein the liquid crystal layer forms a liquid crystal domain taking a radially-inclined orientation in correspondence with each of the plurality of connecting portions by the orientation-regulating force exerted by the first orientation-regulating structure.

3. The liquid crystal display device of claim 1, wherein each of the plurality of connecting portions connects four unit solid portions of the plurality of unit solid portions to one another.

4. The liquid crystal display device of claim 1, wherein:
each of the unit solid portions has a plurality of corners; and each of the plurality of connecting portions connects adjacent unit solid portions of the plurality of unit solid portions to one another via the plurality of corners.

5. The liquid crystal display device of claim 4, wherein the plurality of corners are each acute.

6. The liquid crystal display device of claim 4, wherein the plurality of corners are four corners.

7. The liquid crystal display device of claim 1, wherein the first orientation-regulating structure exerts the orientation-regulating force even in a state where no voltage is applied between the first electrode and the second electrode.

8. The liquid crystal display device of claim 1, wherein the first orientation-regulating structure includes a protrusion protruding from the second substrate toward the liquid crystal layer.

9. The liquid crystal display device of claim 1, wherein the first orientation-regulating structure includes a surface having a horizontal alignment power which is provided on one surface of the second substrate which is closer to the liquid crystal layer.

10. The liquid crystal display device of claim 1, wherein the first orientation-regulating structure includes a surface which is provided on one surface of the second substrate that is closer to the liquid crystal layer and which inclines the liquid crystal molecules in the liquid crystal layer at an angle smaller than that of the vertical alignment.

11. The liquid crystal display device of claim 1, wherein the first orientation-regulating structure exerts the orientation-regulating force only in a state where a voltage is applied between the first electrode and the second electrode.

12. The liquid crystal display device of claim 1, wherein the first orientation-regulating structure includes an opening provided in the second electrode.

13. The liquid crystal display device of claim 1, wherein the second substrate includes a second orientation-regulating structure in an area corresponding to each of the plurality of unit solid portions, the second orientation-regulating structure exerting an orientation-regulating force for the placing liquid crystal molecules in the liquid crystal domain formed in correspondence with each of the plurality of unit solid portions into a radially-inclined orientation at least in a state where a voltage is applied between the first electrode and the second electrode.

14. The liquid crystal display device of claim 13, wherein the second orientation-regulating structure is provided in an area corresponding to a central portion or the vicinity thereof of each of the plurality of unit solid portions.

15. The liquid crystal display device of claim 13, wherein in the liquid crystal domain formed in correspondence with each of the plurality of unit solid portions, an orientation-regulating direction provided by the second orientation-regulating structure matches a direction of the radially-inclined orientation provided by the oblique electric field.

16. The liquid crystal display device of claim 13, wherein the second orientation-regulating structure exerts the orientation-regulating force even in a state where no voltage is applied between the first electrode and the second electrode.

17. The liquid crystal display device of claim 13, wherein the second orientation-regulating structure includes a protrusion protruding from the second substrate toward the liquid crystal layer.

18. The liquid crystal display device of claim 13, wherein the second orientation-regulating structure includes a surface having a horizontal alignment power which is provided on one surface of the second substrate which is closer to the liquid crystal layer.

19. The liquid crystal display device of claim 13, wherein the second orientation-regulating structure includes a surface which is provided on one surface of the second substrate that is closer to the liquid crystal layer and which inclines the liquid crystal molecules in the liquid crystal layer at an angle smaller than that of the vertical alignment.

20. The liquid crystal display device of claim 13, wherein the second orientation-regulating structure exerts the orientation-regulating force only in a state where a voltage is applied between the first electrode and the second electrode.

21. The liquid crystal display device of claim 13, wherein the second orientation-regulating structure includes an opening provided in the second electrode.

22. The liquid crystal display device of claim 1, wherein the plurality of unit solid portions each have a shape having rotational symmetry.

23. The liquid crystal display device of claim 1, wherein the plurality of unit solid portions are each generally star-shaped with four-fold rotational symmetry.

24. The liquid crystal display device of claim 1, wherein the plurality of unit solid portions have substantially the same shape and substantially the same size as one another, and form at least one unit lattice arranged to have rotational symmetry.

25. The liquid crystal display device of claim 1, wherein at least some of the plurality of openings have substantially the same shape and substantially the same size as one another, and form at least one unit lattice arranged to have rotational symmetry.

26. The liquid crystal display device of claim 25, wherein the at least the some of the plurality of openings each have a shape having rotational symmetry.

27. The liquid crystal display device of claim 1, wherein:
the first substrate further includes a switching device provided in correspondence with each of the plurality of picture element regions; and
the first electrode is a picture element electrode provided in each of the plurality of picture element regions and switched by the switching device, and the second electrode is at least one counter electrode opposing the plurality of picture element electrodes.

28. A liquid crystal display device, comprising:
a first substrate, a second substrate, and a liquid crystal layer provided between the first substrate and the second substrate;
wherein:
a plurality of picture element regions are each defined by a first electrode provided on one surface of the first substrate which is closer to the liquid crystal layer and a second electrode provided on the second substrate and opposing the first electrode with the liquid crystal layer interposed therebetween;
in each of the plurality of picture element regions, the liquid crystal layer is in a vertical orientation state when no voltage is applied between the first electrode and the second electrode; and
in each of the plurality of picture element regions, the first electrode includes a plurality of openings, a plurality of generally star-shaped conductive portions each having four acute corners, and a plurality of connecting portions each for connecting four conductive portions of the plurality of conductive portions to one another via the corners; and
the second substrate includes a protrusion in an area corresponding to each of the plurality of connecting portions, the protrusion protruding toward the liquid crystal layer.

29. The liquid crystal display device of claim 28, wherein the second substrate includes another protrusion in an area corresponding to each of the plurality of conductive portions, the protrusion protruding toward the liquid crystal layer.

30. A liquid crystal display device, comprising:
a first substrate, a second substrate, and a liquid crystal layer provided between the first substrate and the second substrate;
wherein:
a plurality of picture element regions are each defined by a first electrode provided on one surface of the first substrate which is closer to the liquid crystal layer and a second electrode provided on the second substrate and opposing the first electrode with the liquid crystal layer interposed therebetween;
in each of the plurality of picture element regions, the liquid crystal layer is in a vertical alignment when no voltage is applied between the first electrode and the second electrode; and
in each of the plurality of picture element regions, the first electrode includes a plurality of openings, a plurality of generally star-shaped conductive portions each having four acute corners, and a plurality of connecting portions each for connecting four conductive portions of the plurality of conductive portions to one another via the corners; and
the second substrate includes an opening provided in an area corresponding to each of the plurality of connecting portions.

31. The liquid crystal display device of claim 30, wherein the second substrate includes another opening provided in an area corresponding to each of the plurality of conductive portions.

* * * * *